United States Patent
Nook et al.

(10) Patent No.: US 11,447,023 B2
(45) Date of Patent: Sep. 20, 2022

(54) PORTABLE VEHICLE BATTERY JUMP START APPARATUS WITH SAFETY PROTECTION AND JUMPER CABLE DEVICE THEREOF

(71) Applicant: THE NOCO COMPANY, Glenwillow, OH (US)

(72) Inventors: Jonathan Lewis Nook, Gates Mills, OH (US); William Knight Nook, Shaker Heights, OH (US); James Richard Stanfield, Peoria, AZ (US); Derek Michael Underhill, Tempe, AZ (US)

(73) Assignee: THE NOCO COMPANY, Glenwillow, OH (US)

( * ) Notice: Subject to any disclaimer, the term of this patent is extended or adjusted under 35 U.S.C. 154(b) by 0 days.

(21) Appl. No.: 16/450,422

(22) Filed: Jun. 24, 2019

(65) Prior Publication Data
US 2019/0308518 A1   Oct. 10, 2019

Related U.S. Application Data

(60) Continuation of application No. 15/921,792, filed on Mar. 15, 2018, now Pat. No. 10,328,808, which is a (Continued)

(51) Int. Cl.
*B60L 53/14*   (2019.01)
*H02J 7/00*    (2006.01)
(Continued)

(52) U.S. Cl.
CPC ............ *B60L 53/14* (2019.02); *H02J 7/0029* (2013.01); *H02J 7/0034* (2013.01);
(Continued)

(58) Field of Classification Search
CPC ......... B60L 53/14; H02J 7/342; H02J 7/0047; H02J 7/0034; H02J 7/0029; H02J 1/122; H02J 7/00; H02J 7/0048; H02J 2310/46
(Continued)

(56) References Cited

U.S. PATENT DOCUMENTS 3,085,187 A   4/1963  Godshalk
3,105,183 A   9/1963  Hysler et al.
(Continued)

FOREIGN PATENT DOCUMENTS

AU    6997198 A      7/1998
AU    2015258229 A1  1/2016
(Continued)

OTHER PUBLICATIONS

Projecta; "2x22 Amp Hour High Performance Jumpstarter"; 2013; pp. 1-20.
(Continued)

*Primary Examiner* — M Baye Diao
(74) *Attorney, Agent, or Firm* — Vorys, Sater, Seymour & Pease LLP; William Klima

(57) ABSTRACT

A handheld device for jump starting a vehicle engine includes a rechargeable lithium ion battery pack and a microcontroller. The lithium ion battery is coupled to a power output port of the device through a FET smart switch actuated by the microcontroller. A vehicle battery isolation sensor connected in circuit with positive and negative polarity outputs detects the presence of a vehicle battery connected between the positive and negative polarity outputs. A reverse polarity sensor connected in circuit with the positive and negative polarity outputs detects the polarity of a vehicle battery connected between the positive and negative polarity outputs, such that the microcontroller will enable power to be delivered from the lithium ion power pack to the output
(Continued)

port only when a good battery is connected to the output port and only when the battery is connected with proper polarity of positive and negative terminals.

54 Claims, 13 Drawing Sheets

Related U.S. Application Data continuation of application No. 15/691,884, filed on Aug. 31, 2017, now Pat. No. 10,604,024, which is a continuation of application No. 14/619,655, filed on Feb. 11, 2015, now Pat. No. 9,770,992, which is a division of application No. 14/325,938, filed on Jul. 8, 2014, now Pat. No. 9,007,015, which is a continuation of application No. PCT/US2014/045434, filed on Jul. 3, 2014.

(51) Int. Cl.
 H02J 7/34 (2006.01)
 H02J 1/10 (2006.01)
(52) U.S. Cl.
 CPC ............ *H02J 7/0047* (2013.01); *H02J 7/342* (2020.01); *H02J 1/122* (2020.01); *H02J 7/00* (2013.01); *H02J 7/0048* (2020.01)
(58) Field of Classification Search
 USPC ....................................................... 320/105
 See application file for complete search history.

(56) References Cited

U.S. PATENT DOCUMENTS

| | | | |
|---|---|---|---|
| 3,267,452 A | 8/1966 | Wolf | |
| 3,590,357 A | 6/1971 | Reid | |
| 3,638,108 A | 1/1972 | Channing | |
| 3,933,140 A | 1/1976 | Gynn | |
| 4,041,445 A | 8/1977 | Carter | |
| 4,142,771 A | 3/1979 | Barnes | |
| 4,740,740 A | 4/1988 | Taranto et al. | |
| 4,885,524 A * | 12/1989 | Wilburn | H01M 10/44 320/105 |
| 4,910,628 A | 3/1990 | Minagawa et al. | |
| 4,931,731 A | 6/1990 | Jenks | |
| 4,972,135 A | 11/1990 | Bates et al. | |
| 4,990,723 A | 2/1991 | Ziberna et al. | |
| 5,083,076 A * | 1/1992 | Scott | H02J 7/0034 320/105 |
| 5,111,130 A | 5/1992 | Bates | |
| 5,189,359 A | 2/1993 | Kronberg | |
| 5,194,799 A | 3/1993 | Tomantschger | |
| 5,281,904 A | 1/1994 | Tomkins | |
| 5,319,298 A | 6/1994 | Wanzong | |
| 5,486,434 A | 1/1996 | Aoyama | |
| 5,496,658 A | 3/1996 | Hein et al. | |
| 5,589,757 A | 12/1996 | Klang | |
| 5,635,817 A | 6/1997 | Shiska | |
| 5,635,818 A | 6/1997 | Quintero | |
| 5,637,978 A | 6/1997 | Kellett | |
| 5,650,974 A * | 7/1997 | Yoshimura | G11C 5/141 365/228 |
| 5,707,257 A | 1/1998 | Kotajima et al. | |
| 5,716,735 A | 2/1998 | Muffoletto et al. | |
| 5,793,185 A | 8/1998 | Prelec et al. | |
| 5,795,182 A | 8/1998 | Jacob | |
| 5,820,407 A | 10/1998 | Morse et al. | |
| 5,831,350 A | 11/1998 | McConkey et al. | |
| 5,921,809 A | 7/1999 | Fink | |
| 5,953,681 A | 9/1999 | Cantatore et al. | |
| 5,965,998 A * | 10/1999 | Whiting | H02J 7/0034 320/165 |
| 6,002,235 A | 12/1999 | Clore | |
| 6,037,778 A | 3/2000 | Makhija | |
| 6,054,779 A | 4/2000 | Zubko | |
| 6,057,667 A | 5/2000 | Mills | |
| 6,130,519 A * | 10/2000 | Whiting | H02J 7/0034 320/105 |
| 6,140,796 A | 10/2000 | Martin et al. | |
| 6,144,110 A | 11/2000 | Matsuda et al. | |
| 6,147,471 A | 11/2000 | Hunter | |
| 6,160,381 A | 12/2000 | Peterzell | |
| 6,212,054 B1 | 4/2001 | Chan | |
| 6,215,273 B1 | 4/2001 | Shy | |
| 6,222,342 B1 | 4/2001 | Eggert et al. | |
| 6,249,106 B1 | 6/2001 | Turner et al. | |
| 6,262,492 B1 | 7/2001 | Sheng | |
| 6,262,559 B1 * | 7/2001 | Eggert | H02J 7/342 320/103 |
| 6,271,605 B1 | 8/2001 | Carkner et al. | |
| 6,300,742 B1 | 10/2001 | Hung | |
| 6,362,599 B1 | 3/2002 | Turner et al. | |
| 6,384,573 B1 | 5/2002 | Dunn | |
| 6,386,907 B1 | 5/2002 | Ruffa | |
| 6,344,733 B1 | 7/2002 | Crass | |
| 6,424,158 B2 | 7/2002 | Klang | |
| 6,426,606 B1 | 7/2002 | Purkey | |
| 6,632,103 B1 | 10/2003 | Liu | |
| 6,648,701 B2 | 11/2003 | Mouissie | |
| 6,650,086 B1 | 11/2003 | Chang | |
| 6,679,212 B2 | 1/2004 | Kelling | |
| 6,679,708 B1 | 1/2004 | Depp et al. | |
| 6,756,764 B2 | 6/2004 | Smith et al. | |
| 6,759,833 B1 | 7/2004 | Chen | |
| 6,774,607 B2 | 8/2004 | Moseneder et al. | |
| 6,799,993 B2 | 10/2004 | Krieger | |
| 6,803,743 B2 | 10/2004 | George et al. | |
| 6,822,425 B2 | 11/2004 | Krieger et al. | |
| 6,856,764 B2 | 2/2005 | Higuma | |
| 6,919,704 B1 | 7/2005 | Healey | |
| 7,015,674 B2 | 3/2006 | Vonderhaar | |
| 7,017,055 B1 | 3/2006 | Ho | |
| 7,095,339 B2 | 8/2006 | Peng et al. | |
| 7,148,580 B2 | 12/2006 | Sodemann et al. | |
| 7,301,303 B1 | 11/2007 | Hulden | |
| 7,339,347 B2 | 3/2008 | Elder et al. | |
| 7,345,450 B2 | 3/2008 | Krieger et al. | |
| 7,508,171 B2 | 3/2009 | Carrier et al. | |
| 7,514,900 B2 | 4/2009 | Sander et al. | |
| D597,029 S | 7/2009 | Li | |
| 7,579,811 B2 | 8/2009 | Satl et al. | |
| 7,656,118 B2 | 2/2010 | Krieger et al. | |
| 7,675,261 B2 | 3/2010 | Elder et al. | |
| 7,679,317 B2 * | 3/2010 | Veselic | G06F 1/266 320/107 |
| 7,749,031 B2 | 7/2010 | Detter | |
| 7,791,319 B2 | 9/2010 | Veselic et al. | |
| D625,265 S | 10/2010 | Dumelle et al. | |
| 7,847,520 B2 | 12/2010 | Veselic et al. | |
| 7,868,582 B2 | 1/2011 | Sander et al. | |
| 7,872,361 B2 | 1/2011 | McFadden | |
| 7,893,558 B2 | 2/2011 | Lee | |
| 7,893,655 B2 | 2/2011 | Veselic | |
| 7,893,657 B2 | 2/2011 | Chavakula | |
| 8,030,900 B2 | 10/2011 | Hussain et al. | |
| D649,116 S | 11/2011 | Nakatsuka | |
| 8,076,900 B1 | 12/2011 | Brown | |
| 8,125,181 B2 | 2/2012 | Gregg et al. | |
| 8,172,603 B1 * | 5/2012 | Richardet, Jr. | H01R 11/24 439/504 |
| 8,199,024 B2 | 6/2012 | Baxter et al. | |
| 8,221,915 B2 | 7/2012 | Tikhonov et al. | |
| 8,362,745 B2 | 1/2013 | Tinaphong | |
| 8,376,775 B2 | 2/2013 | Rinehardt | |
| 8,493,021 B2 | 7/2013 | Richardson et al. | |
| D689,020 S | 9/2013 | Demirjian et al. | |
| 8,686,688 B2 | 4/2014 | Han et al. | |
| 8,736,227 B2 * | 5/2014 | Chadbourne | G06F 1/266 320/107 |
| 8,786,247 B2 | 7/2014 | Ishino et al. | |
| 8,994,327 B2 | 3/2015 | Kusch et al. | |
| D726,109 S | 4/2015 | Nook et al. | |

(56) References Cited

U.S. PATENT DOCUMENTS

| | | |
|---|---|---|
| D726,114 S | 4/2015 | Nook et al. |
| D726,121 S | 4/2015 | Nook et al. |
| 9,007,015 B1 | 4/2015 | Nook et al. |
| 9,007,023 B2 | 4/2015 | Dao |
| 9,041,244 B2* | 5/2015 | Graf ................. B60R 16/03 307/10.7 |
| 9,048,666 B2 | 6/2015 | Su |
| 9,070,938 B2 | 6/2015 | Hashimoto et al. |
| D735,665 S | 8/2015 | Nook et al. |
| 9,153,978 B2 | 10/2015 | Reade |
| 9,197,079 B2 | 11/2015 | Yip et al. |
| D746,774 S | 1/2016 | Nook et al. |
| 9,243,601 B2 | 1/2016 | Reichow |
| 9,263,717 B2 | 2/2016 | Nakano et al. |
| 9,263,907 B2 | 2/2016 | Richardson et al. |
| 9,287,725 B2 | 3/2016 | Huffman et al. |
| 9,506,446 B2 | 11/2016 | Xinfang |
| 9,525,297 B2 | 12/2016 | Wang |
| 9,537,136 B2 | 1/2017 | Ryu |
| 9,601,800 B2 | 3/2017 | Nakamoto et al. |
| 9,608,294 B2 | 3/2017 | Ko |
| 9,718,419 B2 | 8/2017 | Proebstle |
| 9,748,541 B2 | 8/2017 | Burke |
| 9,748,778 B2 | 8/2017 | Toya |
| 9,770,992 B2 | 9/2017 | Nook et al. |
| 9,809,183 B2 | 11/2017 | Weflen |
| 9,871,392 B2 | 1/2018 | Durando et al. |
| 9,874,611 B2 | 1/2018 | Whiting et al. |
| 9,954,391 B2 | 4/2018 | Lei |
| 10,084,173 B2 | 9/2018 | Ha |
| 10,128,483 B2 | 11/2018 | Lee |
| 10,218,172 B2 | 2/2019 | Chen et al. |
| 10,328,806 B2 | 6/2019 | Wang et al. |
| 10,328,808 B2 | 6/2019 | Nook et al. |
| 10,461,545 B2 | 10/2019 | Inoue et al. |
| 10,604,024 B2 | 3/2020 | Nook et al. |
| 10,981,452 B2 | 4/2021 | Nook et al. |
| 2001/0025618 A1 | 10/2001 | Kelling |
| 2001/0003827 A1 | 11/2001 | Resch et al. |
| 2002/0041174 A1 | 4/2002 | Purkey |
| 2002/0007500 A1 | 6/2002 | Fridman et al. |
| 2002/0007699 A1 | 6/2002 | Mouissie |
| 2002/0121877 A1 | 9/2002 | Smith et al. |
| 2002/0155752 A1 | 10/2002 | Winkle et al. |
| 2003/0096158 A1 | 5/2003 | Takano et al. |
| 2003/0141845 A1 | 7/2003 | Krieger |
| 2004/0066168 A1 | 4/2004 | George |
| 2004/0106038 A1 | 6/2004 | Shimamura et al. |
| 2004/0124810 A1 | 7/2004 | Smallwood et al. |
| 2004/0130298 A1 | 7/2004 | Krieger |
| 2004/0150373 A1 | 8/2004 | Chan |
| 2004/0239290 A1 | 12/2004 | Krieger |
| 2005/0040788 A1* | 2/2005 | Tseng ................. H02J 7/0042 320/111 |
| 2005/0082833 A1 | 4/2005 | Sodemann et al. |
| 2005/0110467 A1 | 5/2005 | Thomason |
| 2005/0116688 A1 | 6/2005 | Yin |
| 2005/0162124 A1 | 7/2005 | Bertness et al. |
| 2005/0213867 A1 | 9/2005 | Rajendran et al. |
| 2005/0252573 A1* | 11/2005 | Montani ................. B67D 7/04 141/98 |
| 2006/0071631 A1 | 4/2006 | Cheung et al. |
| 2006/0176011 A1 | 8/2006 | Lui |
| 2006/0220610 A1 | 10/2006 | Solberg |
| 2006/0244412 A1 | 11/2006 | Bonzer |
| 2007/0132427 A1 | 6/2007 | Veselic |
| 2007/0132537 A1 | 6/2007 | Osbun |
| 2007/0178777 A1 | 8/2007 | Miekka |
| 2007/0182363 A1 | 8/2007 | Yang |
| 2007/0278990 A1 | 12/2007 | Raichle |
| 2007/0285049 A1* | 12/2007 | Krieger ............... H01M 50/213 320/105 |
| 2008/0131764 A1 | 6/2008 | Saiki |
| 2008/0150473 A1 | 6/2008 | Wise |
| 2008/0143290 A1 | 7/2008 | Chavakula |
| 2008/0157732 A1 | 7/2008 | Williams |
| 2009/0026837 A1 | 1/2009 | Lee |
| 2009/0039712 A1 | 2/2009 | Czamyszka |
| 2009/0108814 A1 | 4/2009 | Wilkins |
| 2009/0174362 A1 | 7/2009 | Richardson et al. |
| 2009/0218988 A1 | 9/2009 | Richardson et al. |
| 2009/0236859 A1 | 9/2009 | McFadden |
| 2009/0253312 A1 | 10/2009 | Detter et al. |
| 2010/0001682 A1 | 1/2010 | Dickson et al. |
| 2010/0013302 A1 | 1/2010 | Howell et al. |
| 2010/0052620 A1 | 3/2010 | Wong |
| 2010/0055546 A1 | 3/2010 | Elder et al. |
| 2010/0129723 A1 | 5/2010 | Noda et al. |
| 2010/0164439 A1 | 7/2010 | Ido |
| 2010/0173182 A1 | 7/2010 | Baxter |
| 2010/0181959 A1 | 7/2010 | Gibbs et al. |
| 2010/0244766 A1 | 9/2010 | Olsberg |
| 2010/0283623 A1 | 11/2010 | Baxter et al. |
| 2010/0301800 A1 | 12/2010 | Inskeep |
| 2011/0068734 A1 | 3/2011 | Waldron |
| 2011/0117408 A1 | 5/2011 | Lennox |
| 2011/0127947 A1 | 6/2011 | Hunter et al. |
| 2011/0140651 A1 | 6/2011 | Dai |
| 2011/0175461 A1* | 7/2011 | Tinaphong ............ H02J 50/402 307/149 |
| 2011/0250473 A1 | 10/2011 | Kim |
| 2011/0268996 A1 | 11/2011 | Lee |
| 2011/0279089 A1 | 11/2011 | Yeo |
| 2011/0308856 A1 | 12/2011 | Park |
| 2012/0013189 A1 | 1/2012 | Jenkins |
| 2012/0025766 A1 | 2/2012 | Reade |
| 2012/0038365 A1 | 2/2012 | Nagata et al. |
| 2012/0068662 A1 | 3/2012 | Durando et al. |
| 2012/0091944 A1* | 4/2012 | Rogers ................. H02J 7/0042 320/105 |
| 2012/0126818 A1 | 5/2012 | Ishihara |
| 2012/0139498 A1 | 6/2012 | Chang |
| 2012/0169116 A1 | 7/2012 | Graf |
| 2012/0187897 A1* | 7/2012 | Lenk ..................... H01M 10/46 320/101 |
| 2012/0270097 A1 | 10/2012 | Yasui et al. |
| 2012/0295150 A1 | 11/2012 | Gao et al. |
| 2012/0299533 A1 | 11/2012 | Huffman et al. |
| 2012/0319487 A1* | 12/2012 | Shah ..................... H02J 9/062 307/66 |
| 2013/0084471 A1 | 4/2013 | Han et al. |
| 2013/0104817 A1 | 5/2013 | Miller |
| 2013/0154543 A1 | 6/2013 | Richardson et al. |
| 2013/0154544 A1 | 6/2013 | Yokoyama et al. |
| 2013/0154550 A1 | 6/2013 | Balmefrizol et al. |
| 2013/0162029 A1 | 6/2013 | Reichow |
| 2013/0241488 A1* | 9/2013 | Dao ..................... H02J 7/0013 320/111 |
| 2013/0241498 A1 | 9/2013 | Koebler |
| 2013/0295444 A1 | 11/2013 | Kim et al. |
| 2013/0314041 A1* | 11/2013 | Proebstle ............. F02N 11/087 320/109 |
| 2014/0045001 A1 | 2/2014 | Yang |
| 2014/0077755 A1 | 3/2014 | Zhang |
| 2014/0084844 A1 | 3/2014 | Weflen |
| 2014/0113463 A1 | 4/2014 | Peterson et al. |
| 2014/0127550 A1 | 5/2014 | Roh et al. |
| 2014/0139175 A1 | 5/2014 | Gonzalez |
| 2014/0159509 A1* | 6/2014 | Inskeep ................. H02J 7/342 307/150 |
| 2014/0210399 A1 | 7/2014 | Urschel |
| 2014/0368155 A1 | 12/2014 | Chen |
| 2015/0012174 A1 | 1/2015 | Kim et al. |
| 2015/0015184 A1 | 1/2015 | Su |
| 2015/0037662 A1 | 2/2015 | Pinon et al. |
| 2015/0054336 A1 | 2/2015 | Liu |
| 2015/0087182 A1 | 3/2015 | Zhao et al. |
| 2015/0137740 A1* | 5/2015 | Allos ................... H02J 7/0034 320/107 |
| 2015/0222060 A1 | 8/2015 | Kim et al. |
| 2015/0236329 A1 | 8/2015 | Okuda et al. |
| 2015/0306964 A1 | 10/2015 | Wang |
| 2015/0340907 A1 | 11/2015 | Lei |

(56) References Cited

U.S. PATENT DOCUMENTS

| | | |
|---|---|---|
| 2015/0366538 A1 | 12/2015 | McKenna |
| 2015/0380697 A1 | 12/2015 | Osborne et al. |
| 2016/0001666 A1 | 1/2016 | Nook et al. |
| 2016/0111914 A1 | 4/2016 | Willard et al. |
| 2016/0141728 A1 | 5/2016 | Fauteux et al. |
| 2016/0155996 A1 | 6/2016 | Dai |
| 2016/0181587 A1 | 6/2016 | Koebler et al. |
| 2017/0084899 A1 | 3/2017 | Deng et al. |
| 2017/0309872 A1 | 10/2017 | Kuboki et al. |
| 2018/0111491 A1 | 4/2018 | Nook et al. |
| 2018/0215274 A1 | 8/2018 | Nook et al. |
| 2018/0269703 A1 | 9/2018 | Nook et al. |
| 2018/0342891 A1 | 11/2018 | Nook et al. |
| 2018/0345803 A1 | 12/2018 | Nook et al. |
| 2018/0369599 A1 | 12/2018 | Smith |
| 2019/0081472 A1 | 3/2019 | Guo et al. |
| 2019/0308518 A1 | 10/2019 | Nook et al. |

FOREIGN PATENT DOCUMENTS

| | | |
|---|---|---|
| AU | 2016269555 B2 | 1/2017 |
| AU | 2016392707 A1 | 11/2017 |
| AU | 2017217661 B2 | 11/2018 |
| AU | 2019201081 A1 | 3/2019 |
| AU | 2019201559 A1 | 3/2019 |
| AU | 2020201223 A1 | 3/2020 |
| CA | 107977 A | 10/1907 |
| CA | 105457 S | 6/2005 |
| CA | 118796 S | 1/2008 |
| CA | 137883 S | 6/2011 |
| CA | 145036 S | 2/2013 |
| CA | 2 916 782 A1 | 1/2016 |
| CA | 2 957 431 A1 | 8/2017 |
| CA | 3 005 971 A1 | 8/2017 |
| CN | 1440892 A | 9/2003 |
| CN | 201947042 U | 8/2011 |
| CN | 202058834 U | 11/2011 |
| CN | 102414923 A | 4/2012 |
| CN | 102447288 A | 5/2012 |
| CN | 202696190 U | 1/2013 |
| CN | 103035874 A | 4/2013 |
| CN | 103066662 A | 4/2013 |
| CN | 202918052 U | 5/2013 |
| CN | 203211234 U | 9/2013 |
| CN | 203504235 U | 3/2014 |
| CN | 103715737 A | 4/2014 |
| CN | 203522157 U | 4/2014 |
| CN | 104118374 A | 10/2014 |
| CN | 204113515 U | 1/2015 |
| CN | 104442429 A | 3/2015 |
| CN | 104488111 A | 4/2015 |
| CN | 104795527 A | 7/2015 |
| CN | 204516832 U | 7/2015 |
| CN | 204966731 U | 1/2016 |
| CN | 107852004 A | 3/2018 |
| CN | 108884801 A | 11/2018 |
| DE | 295 07 501 | 6/1995 |
| DE | 295 07 501 U1 | 6/1995 |
| DE | 20 2009 016 260 U1 | 3/2010 |
| DE | 102010062708 | 6/2012 |
| DE | 20 2013 102 599 U1 | 8/2013 |
| DE | 10 2014 114 997 A1 | 1/2016 |
| DE | 11 2016 002 206 T5 | 3/2018 |
| DE | 20 2014 011 413 U1 | 4/2020 |
| EP | 2105980 | 9/2009 |
| EP | 2 472 698 A2 | 7/2012 |
| EP | 2605313 | 6/2013 |
| EP | 0616409 | 9/2014 |
| EP | 3286429 A1 | 2/2018 |
| EP | 3308446 A1 | 4/2018 |
| EP | 3407405 A1 | 11/2018 |
| GB | 2 265 267 A | 9/1993 |
| GB | 2527858 A | 1/2016 |
| GB | 2557733 A | 6/2018 |
| GB | 2562950 A | 11/2018 |
| GB | 2584424 A | 12/2020 |
| JP | 2001069673 A | 3/2001 |
| JP | 2002141056 A | 5/2002 |
| JP | 2003-112586 A | 4/2003 |
| JP | 2008-146998 A | 6/2008 |
| JP | 2011023249 A | 2/2011 |
| JP | 2012-004106 A | 1/2012 |
| JP | 2012169161 A | 9/2012 |
| JP | 2012-230962 A | 11/2012 |
| JP | 3182855 U | 4/2013 |
| JP | 3185027 U | 7/2013 |
| JP | 2014-523623 A | 9/2014 |
| JP | 2014232666 A | 12/2014 |
| JP | 2015-115979 A | 6/2015 |
| JP | 2018-534892 A | 11/2018 |
| JP | 2018-536789 A | 12/2018 |
| PH | 1/2013/500793 | 1/2017 |
| WO | 2000/024108 A1 | 4/2000 |
| WO | 2004/036714 A1 | 4/2004 |
| WO | 2005/038952 A2 | 4/2005 |
| WO | 2006/057497 | 6/2006 |
| WO | 2010/129723 A2 | 11/2010 |
| WO | 2010-129723 A2 | 11/2010 |
| WO | 2011/113734 | 9/2011 |
| WO | 2012/036556 | 3/2012 |
| WO | 2012/068635 A1 | 5/2012 |
| WO | 2012/074548 | 6/2012 |
| WO | 2012/080996 | 6/2012 |
| WO | 2012/081140 A1 | 6/2012 |
| WO | 2012/160292 A2 | 11/2012 |
| WO | 2013-137873 A1 | 9/2013 |
| WO | 2013/137873 A1 | 9/2013 |
| WO | 2014/106407 | 10/2014 |
| WO | 2014/206323 | 12/2014 |
| WO | 2015/195321 A1 | 12/2015 |
| WO | 2016/003471 A1 | 1/2016 |
| WO | 2016/025869 A1 | 2/2016 |
| WO | 2017/138963 A1 | 8/2017 |
| WO | 2017/139524 A1 | 8/2017 |
| WO | 2019/021007 A1 | 1/2019 |
| WO | 2021/242833 A1 | 12/2021 |

OTHER PUBLICATIONS

Exhibit 1008, www.xcar360.com.
Exhibit 1009, www.electronicshub.org.
Petition for Inter Partes Review of U.S. Pat. No. 9,007,015; IPR 2020-00944, filed May 14, 2020, 105 pages.
Exhibit 1013, Model: Epower-21 brochure, 2 pages.
Report on the filing or determination of an action regarding a patent or trademark, filed Oct. 19, 2017, *The NOCO Company, Inc.* v. *Shenzhen Valuelink E-Commerce Co., Ltd.*, U.S. District Court for the Northern District of Ohio, Eastern Division, 1 page.
Report on the filing or determination of an action regarding a patent or trademark, filed Oct. 19, 2017, *The NOCO Company, Inc.* v. *Shenzhen ChangXin Yang Technology Co., Ltd.*, U.S. District Court for the Northern District of Ohio, Eastern Division, 1 page.
Report on the filing or determination of an action regarding a patent or trademark, filed Oct. 19, 2017, *The NOCO Company, Inc.* v. *SZ Jingxinghui Electronics Technology Co., Ltd.*, U.S. District Court for the Northern District of Ohio, Eastern Division, 1 page.
Report on the filing or determination of an action regarding a patent or trademark, filed Oct. 19, 2017, *The NOCO Company, Inc.* v. *Shenzhen Anband Technology Co., Ltd.*, U.S. District Court for the Northern District of Ohio, Eastern Division, 1 page.
Report on the filing or determination of an action regarding a patent or trademark, filed Oct. 30, 2017, *The NOCO Company, Inc.* v. *Shenzhen Dika Na'er E-Commerce Co., Ltd.*, U.S. District Court for the Northern District of Ohio, Eastern Division, 1 page.
PTAB notice regarding petition filed in Patent No. 9007015, U.S. Appl. No. 14/325,938, filed Jan. 15, 2018, IPR2018-00503, 1 page.
Report on the filing or determination of an action regarding a patent or trademark, filed Sep. 13, 2018, *The NOCO Company, Inc.* v. *Halo2 Cloud, LLC, QVC, Inc.*, U.S District Court Delaware, 1 page.
Notice of Filing Date Accorded to Petition and Time for Filing Patent Owner Preliminary Response, dated May 21, 2020, *Shenzhen*

(56) References Cited

OTHER PUBLICATIONS

*Carku Technology Co., Ltd.* v. *The NOCO Company*, IPR2020-00944, U.S. Pat. No. 9,007,015, 4 pages.
International Search Report in corresponding PCT/US2014/045434, dated Nov. 3, 2014.
Australian Patent Opposition #1, Australian Patent Application No. 2016269555, Statement of Grounds of Particulars, Brown & Watson International Pty Ltd., Jun. 6, 2019, 6 pages; particular (e), the offering for sale and sale by Asia Bright Industrial (Hong Kong) Co, Ltd. of products identified as the JPS Jump Starter and the JPR Jump Starter prior to Jul. 2014.
Australian Patent Opposition #1, Australian Patent Application No. 2016269555, Evidence in Support, filed Sep. 3, 2019, 24 pages. Declaration of Max Dirnberger.
Australian Patent Opposition #1, Australian Patent Application No. 2016269555, Evidence in Support—Exhibits, filed Sep. 6, 2019,166 pages; Declaration of Max Dirnberger—Annexure MD-1, early specification sheets for "the BW Jumpstarter", 4 pages; Annexure MD-2, product manual for "the BW Jumpstarter", PROJECTA; "2×22 Amp Hour High Performance Jumpstarter"; 2013; 20 pages.
Australian Patent Opposition #2, Australian Patent Application No. 2019201559, Statement of Grounds and Particulars, filed May 21, 2020, 8 pages.
*The Noco Company* v. *Deltona Transformer Corporation and Deltran USA, LLC*, Defendant Deltran USA, LLC's Invalidity Contentions, In the United States District Court for the Middle District of Florida, Orlando Division, USB Implementers Forum, Inc., Battery Charging Specification, Revision 1.1, Apr. 15, 2009 on p. 8, Prior Art Offered for Sale or Publicly Used or Known on pp. 8-10, MICRO-START/PPS, E-Power, Battery Tender Power Pack, PowerAll, and Electromate 400 on p. 10; 141 pages.
*The Noco Co., Inc.* v. *Smartech Products, Inc., et al.*, Smartech, Inc.'s Invalidity and Unenforceability Contents, Bestek 2400A Peak Current Portable Car Jump Starter Power Bank with 1000mAh Capacity (SMARTECH 00062-00069)("Bestek") on p. 2; HALO 7800 mAh Portable Charger for Cell Phones & Tablets (SMARTECH 00070-00071)("HALO") on p. 2; Schumacher Lithium Iron Jump Starter—SL1 Red Fuel (SMARTECH 00072-00073)("Schumacher") on p. 2, filed Jun. 19, 2019, 8 pages.
Farah et al., New Analog Li-ion Battery Charger Using Pulsed Charging Method, 2018, IEEE, pp. 1-4 (Year: 2018).
Mubdir et al. "Smart Charger for Sealed Lead Acid Batteries Based on Parallel Port PC Interfacing", Dec. 1, 2010, IEEE International Conference on Power and Energy, pp. 119-124 (Year: 2010).
Petition for Inter Partes Review of U.S. Pat. No. 9,007,015; 49 pages; filed Jan. 15, 2018.
Defendants' Invalidity and Unenforceability Contentions—Defendant: Shenzhen Lianfa Tong Technology Co., Ltd., et al., Judge Christopher A. Boyko, 5 pages, Sep. 18, 2020; U.S. Pat. No. 9,007,015.
Statement of Defence and Counterclaim—Defendant: Canadian Tire Corporation, Limited, Court File No. T-343-20, 17 pages, Aug. 4, 2020.
Report on the Filing or Determination of an Action Regarding a Patent or Trademark, filed Aug. 14, 2019, *The NOCO Company, Inc.* v. *Shenzhen Liana Tong Technology Co., Ltd. and Shenzhen Meditek Tong Technology Co., Ltd.*, 1 page.
Report on the Filing or Determination of an Action Regarding a Patent or Trademark, filed Aug. 14, 2019, *The NOCO Company, Inc.* v. *Sictec Instruments Company Limited*, 1 page.
Decision Granting Institution of Inter Partes Review, U.S. Pat. No. 9,007,015, U.S. Appl. No. 14/325,938 filed Nov. 12, 2020, IPR2020-00944, 70 pages.
Report on the Filing or Determination of an Action Regarding a Patent or Trademark, filed May 28, 2020, *The NOCO Company, Inc.* v. *Shenzhen Yike Electronics*, 1 page.
Report on the Filing or Determination of an Action Regarding a Patent or Trademark, filed May 28, 2020, *The NOCO Company, Inc.* v. *Guangzhou Unique Electronics Co., Ltd. and Sui Cheng Limited*, 1 page.

Report on the Filing or Determination of an Action Regarding a Patent or Trademark, filed May 28, 2020, *The NOCO Company, Inc.* v. *Zhejiang Quingyou Electronic Commerce Co., Ltd.*, 1 page.
Report on the Filing or Determination of an Action Regarding a Patent or Trademark, filed May 28, 2020, *The NOCO Company, Inc.* v. *Shenzhen GOOLOO E-Commerce Co., Ltd.*, 1 page.
Report on the Filing or Determination of an Action Regarding a Patent or Trademark, filed May 28, 2020, *The NOCO Company, Inc.* v. *Nice Team Enterprise Limited*, 1 page.
Report on the Filing or Determination of an Action Regarding a Patent or Trademark, filed May 28, 2020, *The NOCO Company, Inc.* v. *Aukey Technology Co., Ltd.*, 1 page.
Report on the Filing or Determination of an Action Regarding a Patent or Trademark, filed Mar. 16, 2020, *The NOCO Company, Inc.* v. *Nekteck, Inc.*, 1 page.
Report on the Filing or Determination of an Action Regarding a Patent or Trademark, filed Mar. 13, 2020, The *NOCO Company, Inc* v. *Medcursor, Inc.*, 1 page.
Australian Patent Opposition #2, Notice of Opposition, Australian Patent Application No. 2019201559, Brown & Watson International Pty Ltd., Feb. 21, 2020, 1 page.
The offering for sale and sale by ATD Tools, Inc of a product identified as the ADT 5900 Jump Starter prior to Jul. 2014.
Australian Patent Opposition #3, Notice of Opposition, Australian Patent Application No. 2020201223, Brown & Watson International Pty Ltd , dated Aug. 7, 2020.
German Patent Opposition. German Patent Application No. 102014114997.
D21 advertisement brochure of the opponent transmitted on Dec. 22, 2013.
D22 advertisement brochure of the opponent transmitted on Apr. 23, 2014.
D23 SGS test report relating to jump start devices of the opponent dated Apr. 21, 2014.
D24 TWM417714U1.
D24a machine translation of D24.
D25 data sheet of Topcomtechnology Co., Ltd., for the product "Universal Power Bank", dated Nov. 15, 2011.
D28 affidavit of the manager of the requesting party, 2013.
German Nullity Action, German Patent Application No. 202014011347. 5.
*The Noco Company* v. *Ring Automotive Limited*, HP-2020-000022, Grounds of Invalidity, in the High Court of Justice Business and Property Courts of England and Wales Intellectual Property List (ChD) Patents Court, 2 pages.
The making available to the public by supply, description and/or use of the HP2200 jump starter described in the manual dated Aug. 2013 at Annex a Before Jul. 3, 2014 including in and after Aug. 2013 ('HP2200') (cited on p. 1 of reference *The Noco Company* v. *Ring Automotive Limited*, HP-2020-000022, Grounds of Invalidity).
The Carku E-Power 21 device in so far as it is established to have been made available to the public in the Eariler Proceedings ('Carku E-Power 21) (cited on p. 2 of reference *The Noco Company* v. *Ring Automotive Limited*, HP-2020-000022, Grounds of Invalidity).
*The Noco Company* v. *Shenzhen Valuelink E-Commerces Co., Ltd*, Case No. 1:17-cv-02210, Defendants' Amended Final Invalidity and Unenforceability Contents, Sep. 23, 2019, 5 pages.; The Powerall PBJS12000RD Jump Starter ("Powerall Jump Starter"), offered For sale by Gryphon Mobile Electronics at least as early as Nov. 5, 2013; The Lightning 12V Jump Starter (Lightning Jump Starter), offered for sale by Pilot, Inc. at least as aarly as Mar. 2014; The L3 Model Jump Starter, offered for sale by Shenzhen Tsevie Company as Early as May 19, 2019.
*The Noco Company, Inc.* v. *Shenzhen Changxinyan'G Technology Co., Ltd.*, Case No. 1:17-cv-02209, Defendents' Amended Final Invalidity and Unenforceability Contents, US District Court of North. Ohio, East. District. Powerall PBJS12000RD Jump Starter ("Powerall Jump Starter"), sale by Gryphon Mobile Electronics as early Nov. 5, 2013; Lightning 12V Jump Starter (Lightning Jump Starter), sale by Pilot, Inc. as early Mar. 2014; L3 Model Jump Starter, sale by Shenzhen Tsevie Co as early May 19, 2019.
Notification of Material filed under Section 27, Australian Government IP Australia, Nov. 8, 2016 (3 pages); Declaration of Sheridan

(56) References Cited

OTHER PUBLICATIONS

Lee (8 pages); Annexure SL-1 (8 pages); Annexure SL-2 (10 pages); Annexure SL-3 (9 pages); Annexure SL-4 (18 pages); Annexure SL-5, JP 3185027 (14 pages); Annexure SL-6 of English Translation of JP 3185027 (17 pages) and U.S. Appl. No. 2004/0130298 (14 pages).
This Portable USB Charger Battery Pack Can Also Jump Start Your Car (viewed on Internet on Oct. 27, 2020] <URL: https://www.howtogeek.com/179499/this-portable-usb-charger-battery-pack-can-also-jump-start-your-car/>, published on Jan. 13, 2014.
Clore Automotive, LLC, U.S. International Trade Commission, Investigation No. 337-TA-1256, Response of Clore Automotive, LLC to the Amended Complaint and Notice of Investigation, pp. 150-151.
Deltran USA, LLC, U.S. International Trade Commission, Investigation No. 337-TA-1256 Deltran USA, LLC'S Response to the Amended Complaint and Notice of Investigation, pp. 196-219.
Schumaker Electric Corporation and Schumacher Power Technology (Binhai) Co. Ltd., U.S. International Trade Commission, Investigation No. 337-TA-1256, Response of Schumacher Electric Corporaton and Schumacher Power Technology (Binhai) Co. Ltd., to the Complaint of The Noco Company Under Section 337 of the Tariff Act of 1930 and Notice of Investigation, pp. 180-184.
Best Buy Co., Inc., U.S. International Trade Commission, Investigation No. 337-TA-1256, Response of Best Buy Co., Inc. To the First Amended Complaint and the Notice of Investigation, pp. 69-71.
Guangdong Boltpower Energy Co, Ltd., U.S. International Trade Commission, Investigation No. 337-TA-1256, Response of Guangdong Boltpower Energy Co., Ltd. To the First Amended Complaint and The Notice of Investigation, pp. 73-74.
Winplus North America, Inc. U.S. International Trade Commission, Investigation No. 337-TA-1256, Response of Winplus North America, Inc. To the Amended Complaint and the Commissioner's Notice of Investigation, Exhibit B, pp. 1-5.
Autozone, Inc. U.S. International Trade Commission, Investigation No. 337-TA-1256, Respondents Autozone, Inc. and Best Parts, Inc.'S Response To the Amended Complaint and Notice of Investigation.
Shenzhen Carku Tech. Co., Ltd., 70MAI Co., Ltd., Antigravity Battenes LLC, Gooloo Tech. LLC, Great Neck Saw Manufactures, Inc., Horizon Tool, Inc., MATCO Tools Corp., Nekteck, Inc., Paris Corp., Powermax Battery (U.S.A.), Inc., and Shenzhen Gooloo E-Commerce Co., Ltd. U.S. Intl. Trade Commission, Invest. No. 337-TA-1256, Response To the Amended Complaint and Notice of Investigation, Exhibit B, pp. 1-3.
Walmart Inc., U.S. International Trade Commission, Investigation No. 337-TA-1256, Response of Walmart Inc., To The Complaint of The Noco Company Under Section 337 of the Tariff Act of 1930 and Notice of Investigation.
Smartech Products, Inc., U.S. International Trade Commission, Investigation No. 337-TA-1256, Respondent Smartech Products, Inc.'S Response To the Complaint Under 337 of the Tariff Act of 1930, as Amended, and Notice of Investigation, pp. 98-102.
Halo2cloud, LLC and ZAGG Inc., U.S. International Trade Commission, Investigation No. 337-TA-1256, Response of HALo2CLOUD, LLC and ZAGG Inc To the Second Amended Complaint and Notice of Investigation, pp. 141-142.
QVC, Inc., U.S. International Trade Commission, Investigation No. 337-1256, Response of QVC, Inc. To the Second Amended Complaint and Notice of Investigation, pp. 144-145.
In re Certain Portable Battery Jumpstarters and Components Thereof, 3370TA01256, United States International Trade Commission (Mar. 17, 2021); Respondents Initial Invalidity Contentions, 14pages.
Fairchild MC78XX/LM78XX/MC78XXA 3-Terminal 1A Positive Voltage Regulator.
USB Battery Charging 1.2 Compliance Plan, Rev. 1.0.
Xysemi XR3403.
Texas Instruments LM2621.
USB Implementers Forum, Inc., Battery Charging Specification, Revision 1.1.
Carku Epower-20B catalog information.
USB Power Delivery Specification 1.0, Jul. 16, 2012, Exhibit 1045.
XP 55517268A 1, NOCO Product Brochure, Jump Starter, Lithium GB70 2000A 12V.
XP 55517270A 1, NOCO Product Brochure, Jump Starter, Lithium GB40 1000A 12V.
USB Battery Charging Specification Version 1.2 (EX1009).
Grounds of Invalidity: Annex A to the Grounds of Invalidity; PROJECTA product manual for 2200A JumpStarter, P/No. s HP 2012, HP 2200.; Carku E-Power 21 device.
Grounds of Invalidity: Prior use of the Carku E-Power 21 device ("Carku E-Power 21"); User manual for Carku E-Power 21 (Ann 1).; Specification sheet for Carku E-Power 21 (Ann 2).; Claimant's E-catalogue dated Apr. 22, 2014, which included Carku E-Power 21 (Ann 3).; Photograph of claimants' booth at 115th 2014 Canton Fair (Ann 4). Photographs and quotation sheet rcvd by Edelbert Lenz GmbH & Co. KG (Ann 5).; User manuals and specification sheets rcvd by Kaz Corp, of Japan (Ann 6).; E-Catalogue rcvd by email by Krautli (Schweiz) AG (Ann 7).
Defendant Deltona Transformer Corporation'S Invalidity Contentions: USB Implemented Forum, Inc, Battery Charging Specification, Rev 1.1, Apr. 15, 2009.; Micro-Start/PPS, offered for sale as late as Jul. 29, 2013, by Antigravity Batteries.; E-Power, offered for sale as late as Apr. 15, 2013 by Carku.; Battery Tender Power Pack, offered for sale prior to Jul. 3, 2014 by Carku/Deltran USA LLC.; PowerAll, offered for sale as late as Mar. 26, 2014 by Gryphon Mobile Electronics LLC.; Electromate 400, offered for sale as late as 2013 by Black & Decker.
DEFENDANT TII Trading Inc.'s Invalidity Contentions.
Defendant's Invalidity and Unenforceability Contentions: USB Battery Charging Spec Ver 1.2., E-flite EC Connector Assembly Instruct w 2008.; Datasheet for LM7805 Voltage Regulator from Fairchild Semiconductor.; Carku Product Brochure for Epower-20 jump starter product.; Carku Product Brochure for Epower-21 jump starter product.; MC78XX/LM78XX/MC78XXA 3-Terminal 1A Positive Voltage Regulator from Fairchild Semiconductor Corp 2001 ; Patent Owner The NOCO Company's Preliminary Response in Dongguan IPR.
Memo Opin and Order of US Dist Ct Jud Barker construing disputed terms of claims 1, 9 and 19 of the '015 issued *NOCO* v. *SmarTech Produts, Inc.*, 1:18-cv-2780 (N.D. Ohio Apr. 2, 2020; *NOCO Amend Compl NOCO* v. *Shenzhen Janfa Tong Tech Co., Ltd.*, et al., 1:19-cv-01855 (N.D. Ohio Apr. 2, 2020; Dec Wan; Dec Hartup; Dec Kirtley; Special Waster Report on Prop Claim Const For U.S. Pat. No. 9,007,015 issued *NOCO* v. *Shenzhen Dika Na'Er E-Commerce Co.*, 1:17CV2282 (N.D. Ohio Jun. 28, 2018) acc/adopt by US Dist Cl Jud Boyko, 2019 WL 1723358.
Defendants' Amended Final Invalidity and Unenforceability Contentions: The Powerall PBJS12000RD Jump Starter, offered for sale by Gryphon Mobile Electronics at least as early as Nov. 5, 2013.; The Lightning 12V Jump Starter, offered for sale by Pilot, Inc. at least as early as Mar. 2014.; The L3 Model Jump Starter, offered for sale by Shenzhen Tsevie Company at least as early as May 19, 2019.
Statement of Defense and Counterclaim: Carku Epower-20 jump starter; Carku Epower-21 jump starter Carku Product Brochure for the Epower-20 jump starter product; Carku Product Brochure for the Epower-21 jump starter product.
Australian Office Action for AU Patent Application No. AU2020201224, dated Oct. 26, 2021.
Declaration by Cory Seligman (30 Pages) and ANNEXURE marked CS-1 (137 Pages), in the matter of AU 2019201559 and Opposition by Brown & Watson; Nov. 23, 2020.
Petition for Inter Partes Review of U.S. Pat. No. 9,007,015 for *Shenzhen Mediatek Tong Technology* v. *Noco Company* (69 Pages); IPR2020-01387; Jul. 29, 2020.
Petition for Inter Partes Review of U.S. Pat. No. 9,007,015 for *Guangdong Boltpower Energy Co., Ltd.* v. *Noco Company* (106 Pages); IPR2021-00309; Dec. 11, 2020.
Exhibit 1004 from IPR2021-00309; Ptab Decision Denying Institution of Inter Partes Review of the '015 patent in Case IPR2018-00503.

(56) References Cited

OTHER PUBLICATIONS

Exhibit 1016 from IPR2020-01387; *The NOCO Company, Inc. v. Shenzhen Lianfa Tong Technology Co. Ltd., et al.*, Case No. 1:19-cv-01855, (N.D. Ohio) First Amended Complaint for Patent Infringement.

* cited by examiner

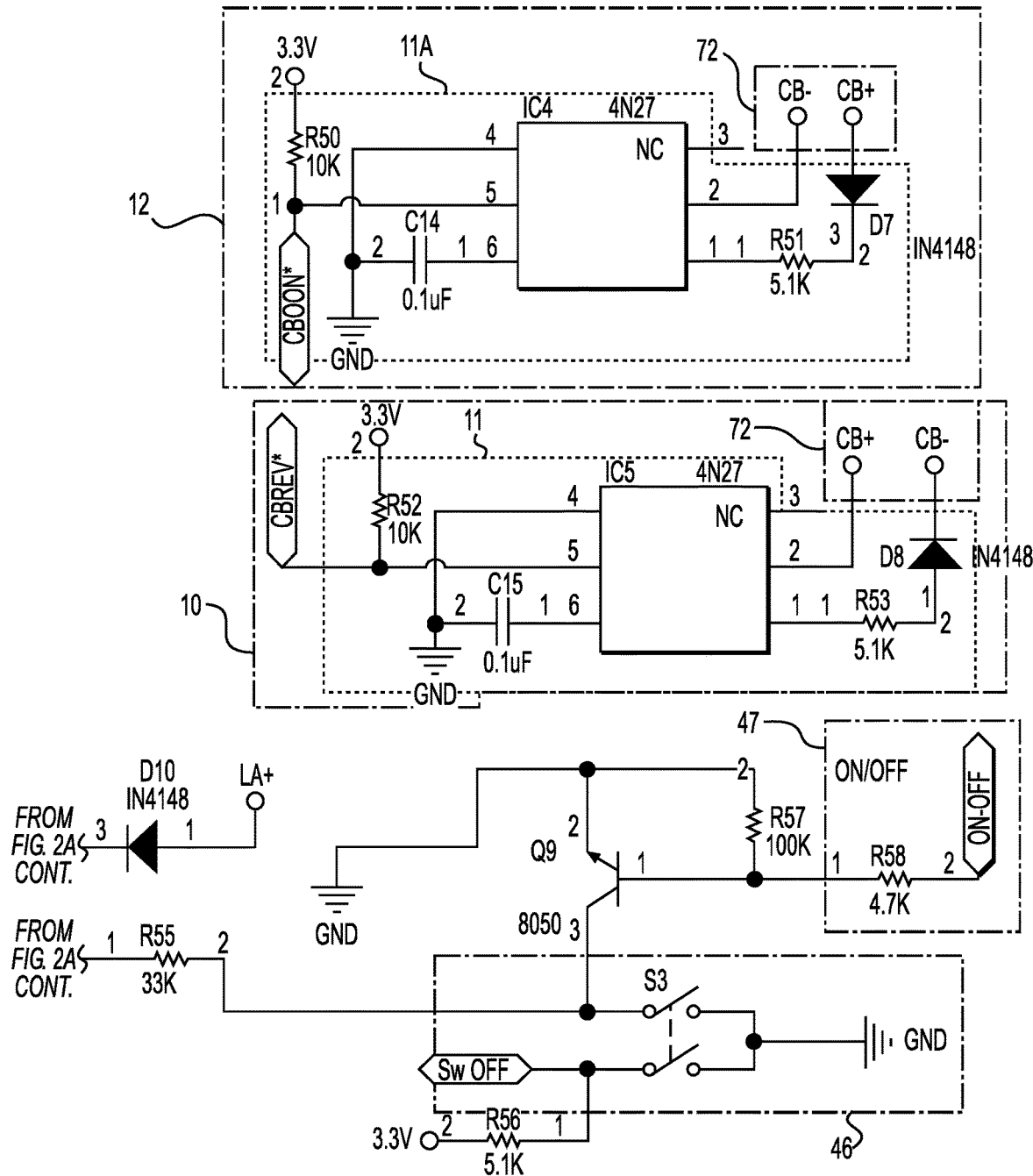
FIG. 2A CONT.
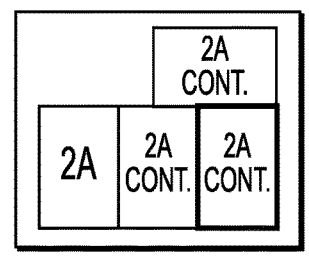

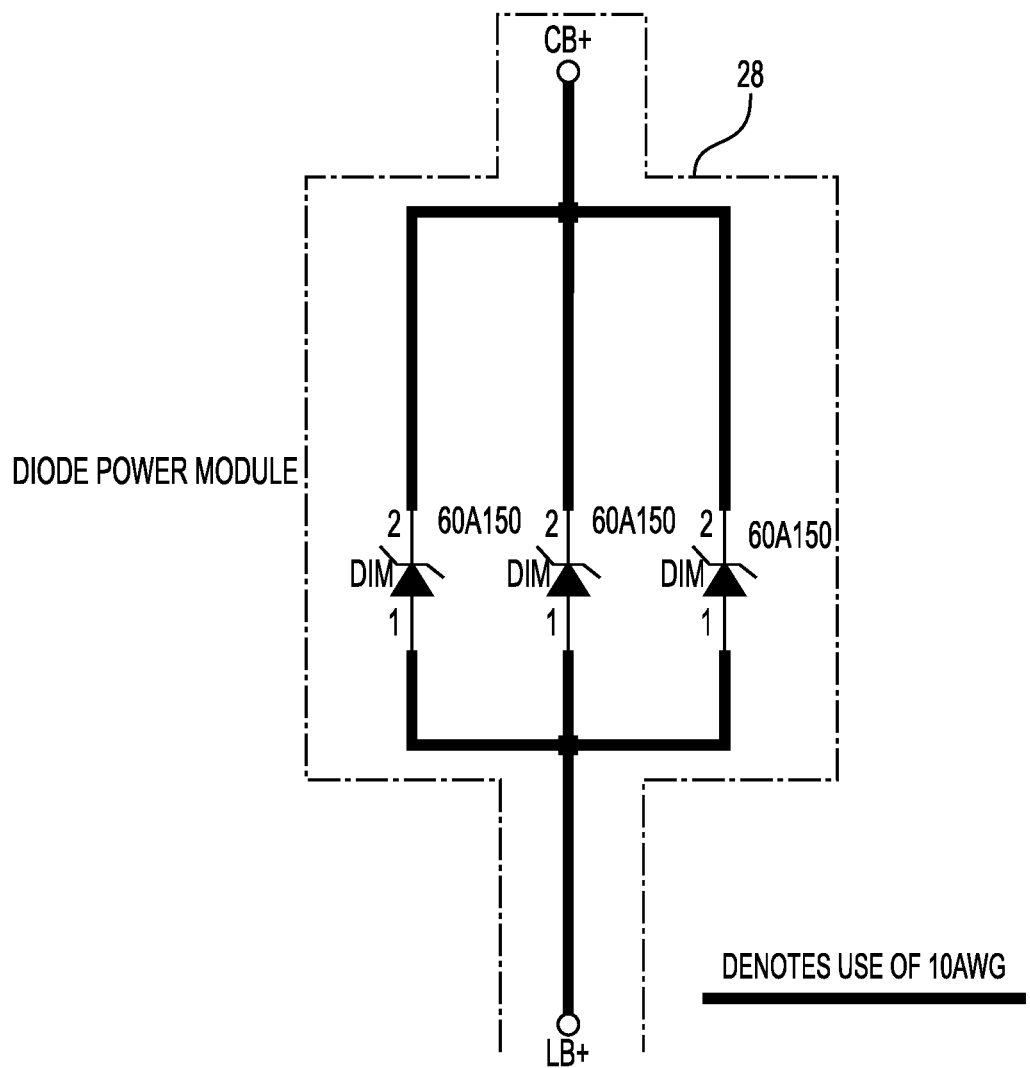
FIG. 2B
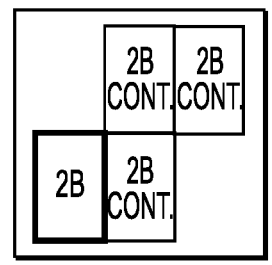

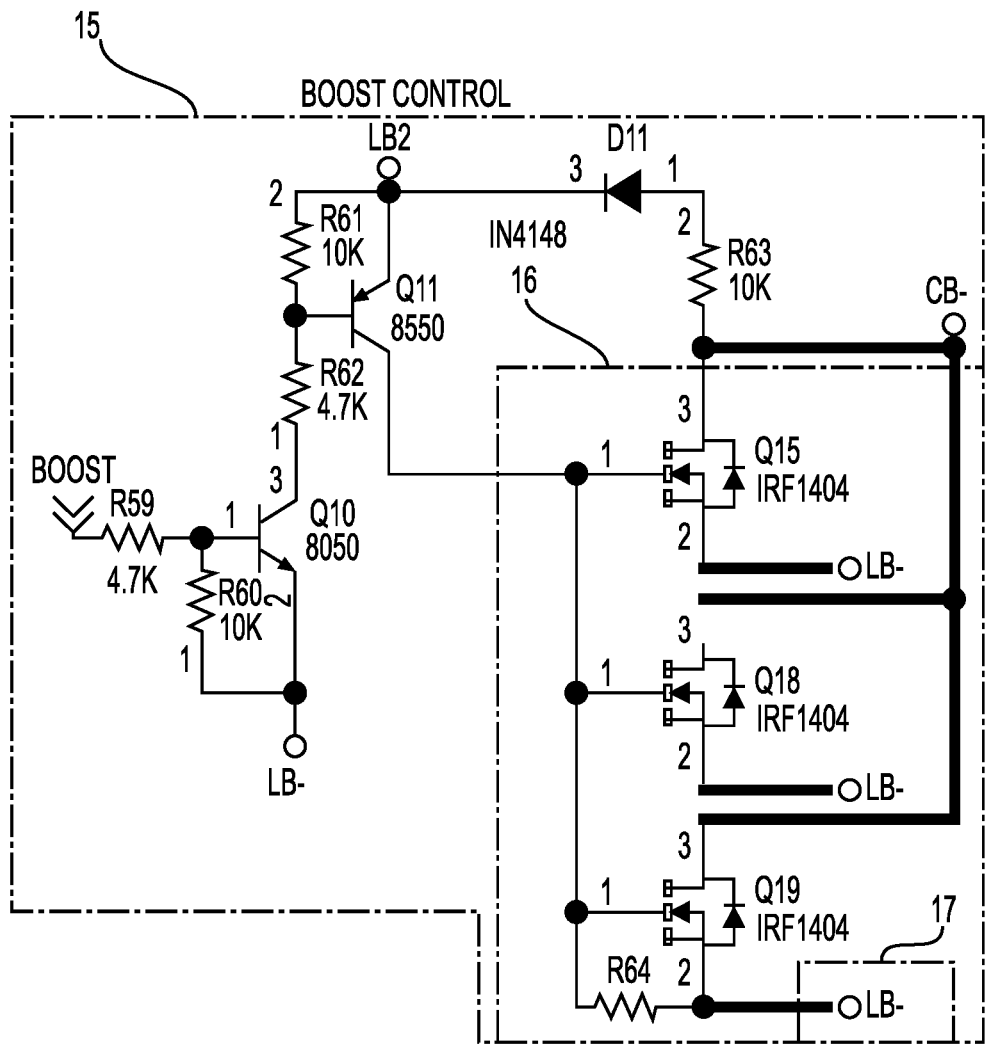
FIG. 2B CONT.
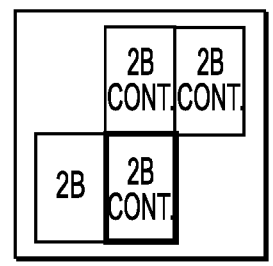

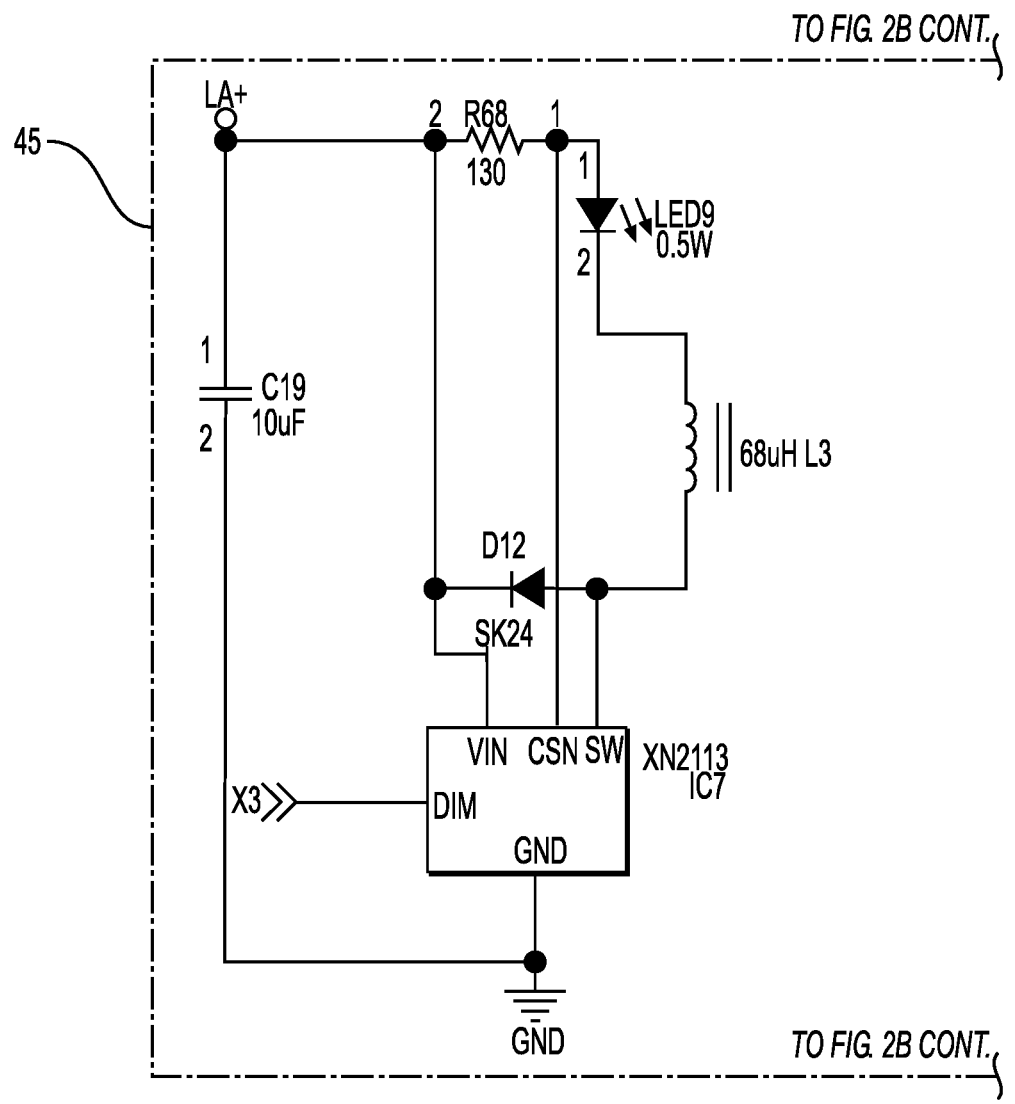
FIG. 2B CONT.
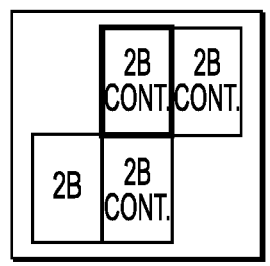

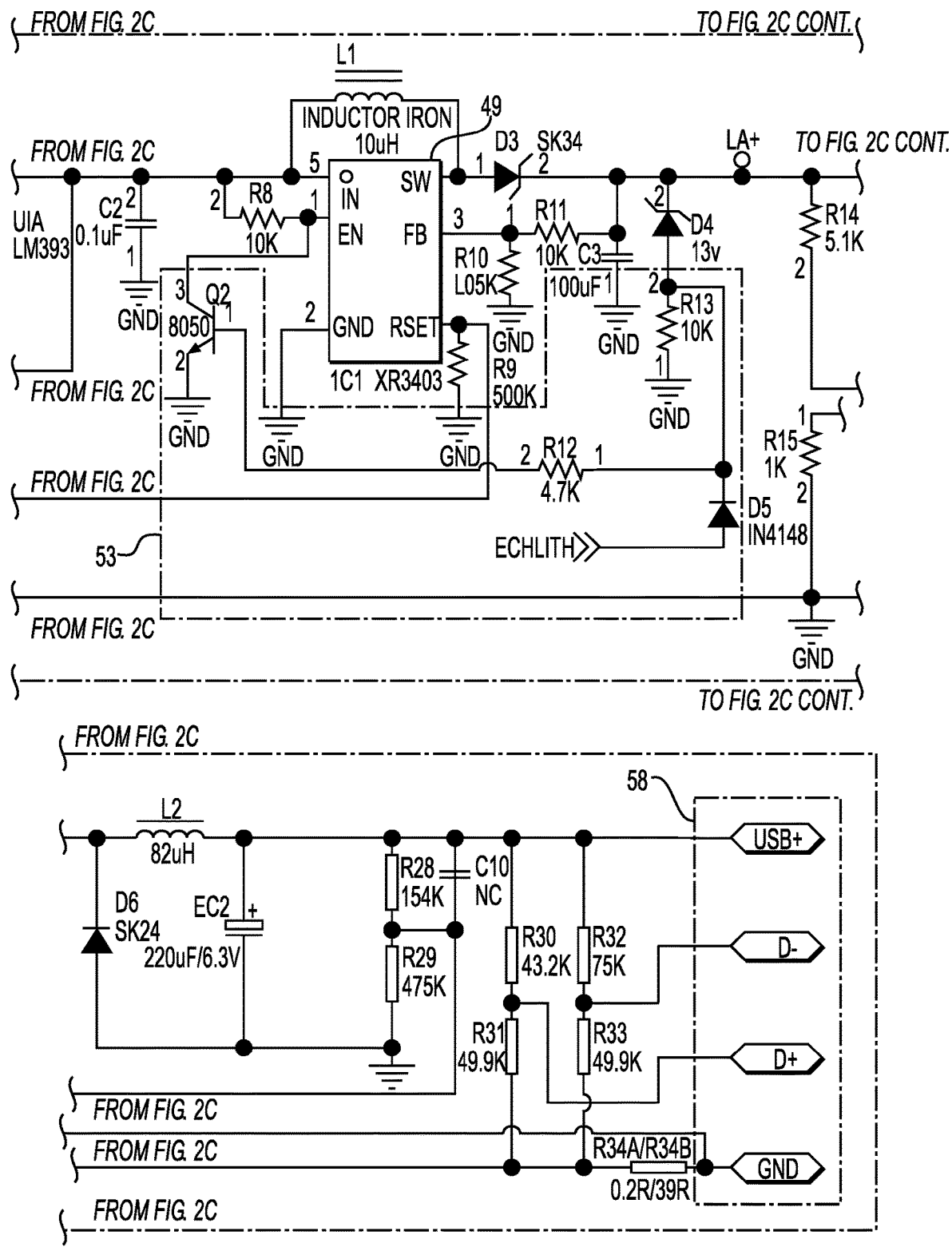
FIG. 2C CONT.
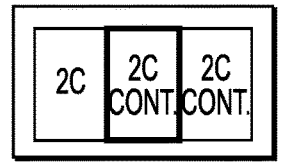

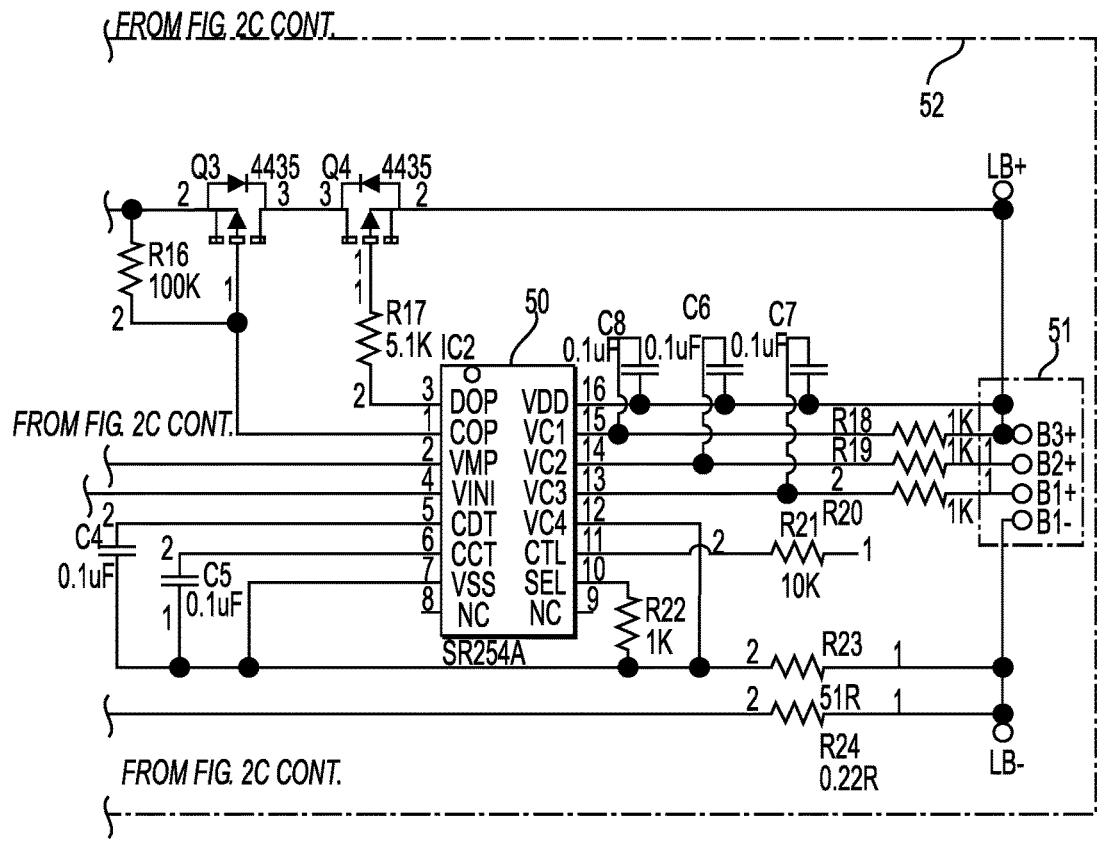
FIG. 2C CONT.
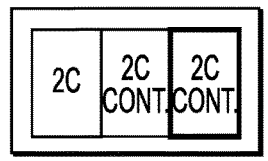

PORTABLE VEHICLE BATTERY JUMP START APPARATUS WITH SAFETY PROTECTION AND JUMPER CABLE DEVICE THEREOF

BACKGROUND OF THE INVENTION

The present invention relates generally to apparatus for jump-starting a vehicle having a depleted or discharged battery. Prior art devices are known, which provide either a pair of electrical connector cables that connect a fully-charged battery of another vehicle to the engine start circuit of the dead battery vehicle, or portable booster devices which include a fully-charged battery which can be connected in circuit with the vehicle's engine starter through a pair of cables.

Problems with the prior art arose when either the jumper terminals or clamps of the cables were inadvertently brought into contact with each other while the other ends were connected to a charged battery, or when the positive and negative terminals were connected to the opposite polarity terminals in the vehicle to be jumped, thereby causing a short circuit resulting in sparking and potential damage to batteries and/or bodily injury.

Various attempts to eliminate these problems have been made in the prior art. U.S. Pat. No. 6,212,054 issued Apr. 3, 2001, discloses a battery booster pack that is polarity sensitive and can detect proper and improper connections before providing a path for electric current flow. The device uses a set of LEDs connected to optical couplers oriented by a control circuit. The control circuit controls a solenoid assembly controlling the path of power current. The control circuit causes power current to flow through the solenoid assembly only if the points of contact of booster cable clamp connections have been properly made.

U.S. Pat. No. 6,632,103 issued Oct. 14, 2003, discloses an adaptive booster cable connected with two pairs of clips, wherein the two pairs of clips are respectively attached to two batteries to transmit power from one battery to the other battery. The adaptive booster cable includes a polarity detecting unit connected to each clip, a switching unit and a current detecting unit both provided between the two pairs of clips. After the polarity of each clip is sensed by the polarity detecting unit, the switching unit generates a proper connection between the two batteries. Therefore, the positive and negative terminals of the two batteries are correctly connected based on the detected result of the polarity detecting unit.

U.S. Pat. No. 8,493,021 issued Jul. 23, 2013, discloses apparatus that monitors the voltage of the battery of a vehicle to be jump started and the current delivered by the jump starter batteries to determine if a proper connection has been established and to provide fault monitoring. Only if the proper polarity is detected can the system operate. The voltage is monitored to determine open circuit, disconnected conductive clamps, shunt cable fault, and solenoid fault conditions. The current through the shunt cable is monitored to determine if there is a battery explosion risk, and for excessive current conditions presenting an overheating condition, which may result in fire. The system includes an internal battery to provide the power to the battery of the vehicle to be jump started. Once the vehicle is started, the unit automatically electrically disconnects from the vehicle's battery.

U.S. Pat. No. 5,189,359 issued Feb. 23, 1993, discloses a jumper cable device having two bridge rectifiers for developing a reference voltage, a four-input decoder for determining which terminals are to be connected based on a comparison of the voltage at each of the four terminals to the reference voltage, and a pair of relays for effecting the correct connection depending on the determination of the decoder. No connection will be made unless only one terminal of each battery has a higher voltage than the reference voltage, indicating "positive" terminals, and one has a lower voltage than the reference voltage, indicating "negative" terminals, and that, therefore, the two high voltage terminals may be connected and the two lower voltage terminals may be connected. Current flows once the appropriate relay device is closed. The relay device is preferably a MOSFET combined with a series array of photodiodes that develop MOSFET gate-closing potential when the decoder output causes an LED to light.

U.S. Pat. No. 5,795,182 issued Aug. 18, 1998, discloses a polarity independent set of battery jumper cables for jumping a first battery to a second battery. The apparatus includes a relative polarity detector for detecting whether two batteries are configured cross or parallel. A three-position high current capacity crossbar pivot switch is responsive to the relative polarity detector for automatically connecting the plus terminals of the two batteries together and the minus terminals of the two batteries together regardless of whether the configuration detected is cross or parallel, and an undercurrent detector and a delay circuit for returning the device to its ready and unconnected state after the device has been disconnected from one of the batteries. The crossbar pivot switch includes two pairs of contacts, and a pivot arm that pivots about two separate points to ensure full electrical contact between the pairs of contacts. The invention can also be used to produce a battery charger that may be connected to a battery without regard to the polarity of the battery.

U.S. Pat. No. 6,262,492 issued Jul. 17, 2001, discloses a car battery jumper cable for accurately coupling an effective power source to a failed or not charged battery, which includes a relay switching circuit connected to the power source and the battery by two current conductor pairs. First and second voltage polarity recognition circuits are respectively connected to the power source and the battery by a respective voltage conductor pair to recognize the polarity of the power source and the battery. A logic recognition circuit produces a control signal subject to the polarity of the power source and the battery, and a driving circuit controlled by the control signal from the logic recognition circuit drives the relay switching circuit, enabling the two poles of the power source to be accurately coupled to the two poles of the battery.

U.S. Pat. No. 5,635,817 issued Jun. 3, 1997, discloses a vehicle battery charging device that includes a control housing having cables including a current limiting device to prevent exceeding of a predetermined maximum charging current of about 40 to 60 amps. The control housing includes a polarity detecting device to verify the correct polarity of the connection of the terminals of the two batteries and to electrically disconnect the two batteries if there is an incorrect polarity.

U.S. Pat. No. 8,199,024 issued Jun. 12, 2012, discloses a safety circuit in a low-voltage connecting system that leaves the two low-voltage systems disconnected until it determines that it is safe to make a connection. When the safety circuit determines that no unsafe conditions exist and that it is safe to connect the two low-voltage systems, the safety circuit may connect the two systems by way of a "soft start" that provides a connection between the two systems over a period of time that reduces or prevents inductive voltage spikes on one or more of the low-voltage systems. When one of the low-voltage systems has a completely-discharged battery incorporated into it, a method is used for detection of proper polarity of the connections between the low-voltage systems. The polarity of the discharged battery is determined by passing one or more test currents through it and determining whether a corresponding voltage rise is observed.

U.S. Pat. No. 5,793,185 issued Aug. 11, 1998, discloses a hand-held jump starter having control components and circuits to prevent overcharging and incorrect connection to batteries.

While the prior art attempted solutions to the abovementioned problems as discussed above, each of the prior art solutions suffers from other shortcomings, either in complexity, cost or potential for malfunction. Accordingly, there exists a need in the art for further improvements to vehicle jump start devices.

SUMMARY OF THE INVENTION

In accordance with an aspect of the invention, apparatus is provided for jump starting a vehicle engine, including: an internal power supply; an output port having positive and negative polarity outputs; a vehicle battery isolation sensor connected in circuit with said positive and negative polarity outputs, configured to detect presence of a vehicle battery connected between said positive and negative polarity outputs; a reverse polarity sensor connected in circuit with said positive and negative polarity outputs, configured to detect polarity of a vehicle battery connected between said positive and negative polarity outputs; a power FET switch connected between said internal power supply and said output port; and a microcontroller configured to receive input signals from said vehicle isolation sensor and said reverse polarity sensor, and to provide an output signal to said power FET switch, such that said power FET switch is turned on to connect said internal power supply to said output port in response to signals from said sensors indicating the presence of a vehicle battery at said output port and proper polarity connection of positive and negative terminals of said vehicle battery with said positive and negative polarity outputs.

In accordance with another aspect of the invention, the internal power supply is a rechargeable lithium ion battery pack.

In accordance with yet another aspect of the invention, a jumper cable device is provided, having a plug configured to plug into an output port of a handheld battery charger booster device having an internal power supply; a pair of cables integrated with the plug at one respective end thereof; said pair of cables being configured to be separately connected to terminals of a battery at another respective end thereof.

DETAILED DESCRIPTION OF THE INVENTION

Figure 1:
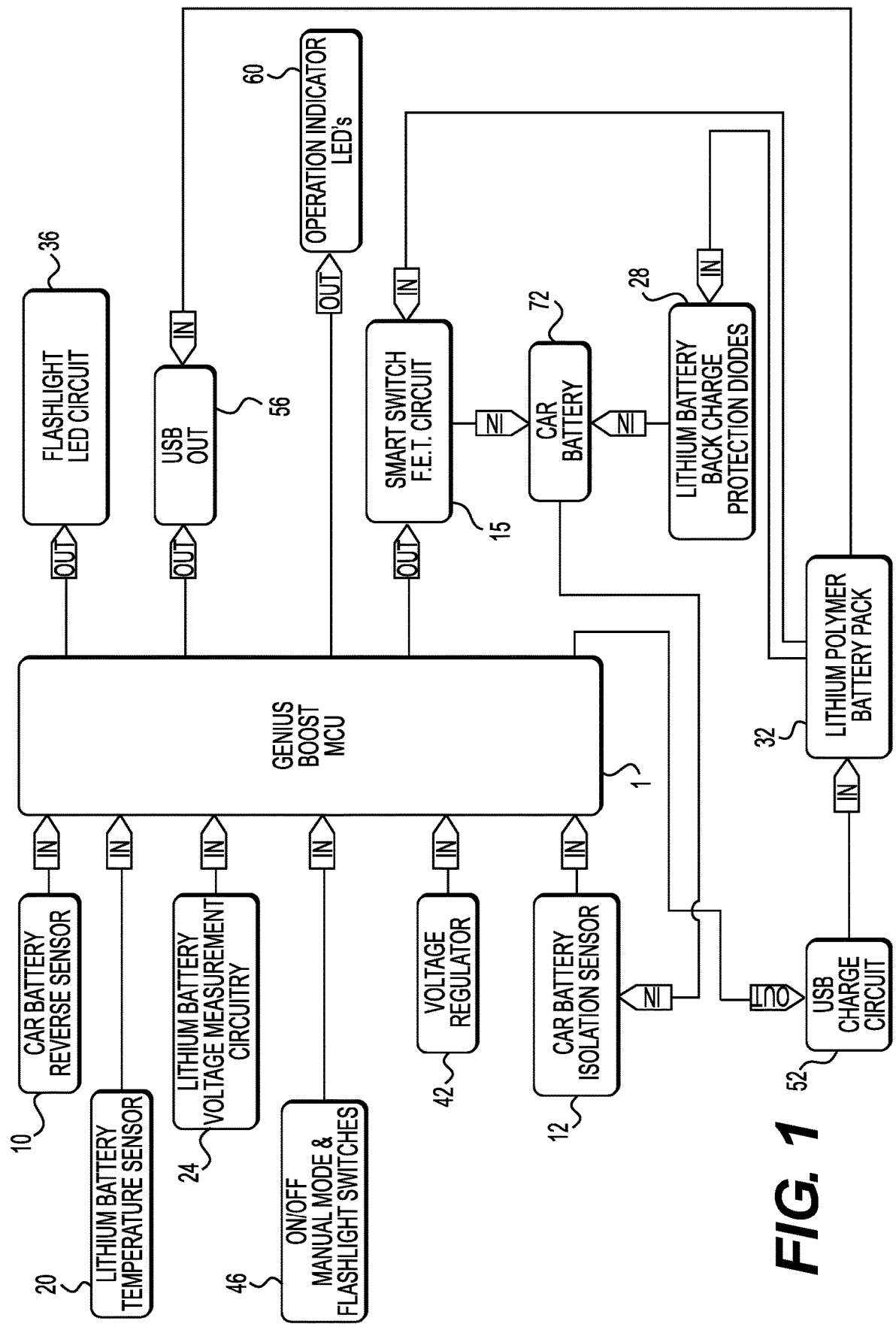
FIG. 1 is a functional block diagram of a handheld vehicle battery boost apparatus in accordance with one aspect of the present invention.

FIG. 1 is a functional block diagram of a handheld battery booster according to one aspect of the invention. At the heart of the handheld battery booster is a lithium polymer battery pack 32, which stores sufficient energy to jump start a vehicle engine served by a conventional 12 volt lead-acid or valve regulated lead-acid battery. In one example embodiment, a high-surge lithium polymer battery pack includes three 3.7V, 2666 mAh lithium polymer batteries in a 3S1P configuration. The resulting battery pack provides 11.1V, 2666 Ah (8000 Ah at 3.7V, 29.6 Wh). Continuous discharge current is 25C (or 200 amps), and burst discharge current is 50C (or 400 amps). The maximum charging current of the battery pack is 8000 mA (8 amps).

A programmable microcontroller unit (MCU) 1 receives various inputs and produces informational as well as control outputs. The programmable MCU 1 further provides flexibility to the system by allowing updates in functionality and system parameters, without requiring any change in hardware. According to one example embodiment, an 8 bit microcontroller with 2K×15 bits of flash memory is used to control the system. One such microcontroller is the HT67F30, which is commercially available from Holtek Semiconductor Inc.

A car battery reverse sensor 10 monitors the polarity of the vehicle battery 72 when the handheld battery booster device is connected to the vehicle's electric system. As explained below, the booster device prevents the lithium battery pack from being connected to the vehicle battery 72 when the terminals of the battery 72 are connected to the wrong terminals of the booster device. A battery presence sensor (e.g. car battery isolation sensor 12) detects whether or not a vehicle battery 72 is present and connected to the booster device, and prevents the lithium battery pack from being connected to the output terminals of the booster device unless there is a good (e.g. chargeable) battery present and connected to the output terminals.

A smart switch FET circuit 15 electrically switches the handheld battery booster lithium battery to the vehicle's electric system only when the vehicle battery is determined by the MCU 1 to be present (in response to a detection signal provided by isolation sensor 12) and connected with the correct polarity (in response to a detection signal provided by reverse sensor 10). A lithium battery temperature sensor 20 monitors the temperature of the lithium battery pack 32 to detect overheating due to high ambient temperature conditions and overextended current draw during jump starting. A lithium battery voltage measurement circuit 24 monitors the voltage of the lithium battery pack 32 to prevent the voltage potential from rising too high during a charging operation and from dropping too low during a discharge operation.

Lithium battery back-charge protection diodes 28 prevent any charge current being delivered to the vehicle battery 72 from flowing back to the lithium battery pack 32 from the vehicle's electrical system. Flashlight LED circuit 36 is provided to furnish a flashlight function for enhancing light under a vehicle's hood in dark conditions, as well as providing SOS and strobe lighting functions for safety purposes when a vehicle may be disabled in a potentially dangerous location. Voltage regulator 42 provides regulation of internal operating voltage for the microcontroller and sensors. On/Off manual mode and flashlight switches 46 allow the user to control power-on for the handheld battery booster device, to control manual override operation if the vehicle has no battery, and to control the flashlight function. The manual button functions only when the booster device is powered on. This button allows the user to jump-start vehicles that have either a missing battery, or the battery voltage is so low that automatic detection by the MCU is not possible. When the user presses and holds the manual override button for a predetermined period time (such as three seconds) to prevent inadvertent actuation of the manual mode, the internal lithium ion battery power is switched to the vehicle battery connect port. The only exception to the manual override is if the car battery is connected in reverse. If the car battery is connected in reverse, the internal lithium battery power shall never be switched to the vehicle battery connect port.

USB charge circuit 52 converts power from any USB charger power source, charge voltage and current for charging the lithium battery pack 32. USB output 56 provides a USB portable charger for charging smartphones, tablets, and other rechargeable electronic devices. Operation indicator LEDs 60 provide visual indication of lithium battery capacity status as well as an indication of smart switch activation status (indicating that power is being provided to the vehicle's electrical system).

Figure 2A:
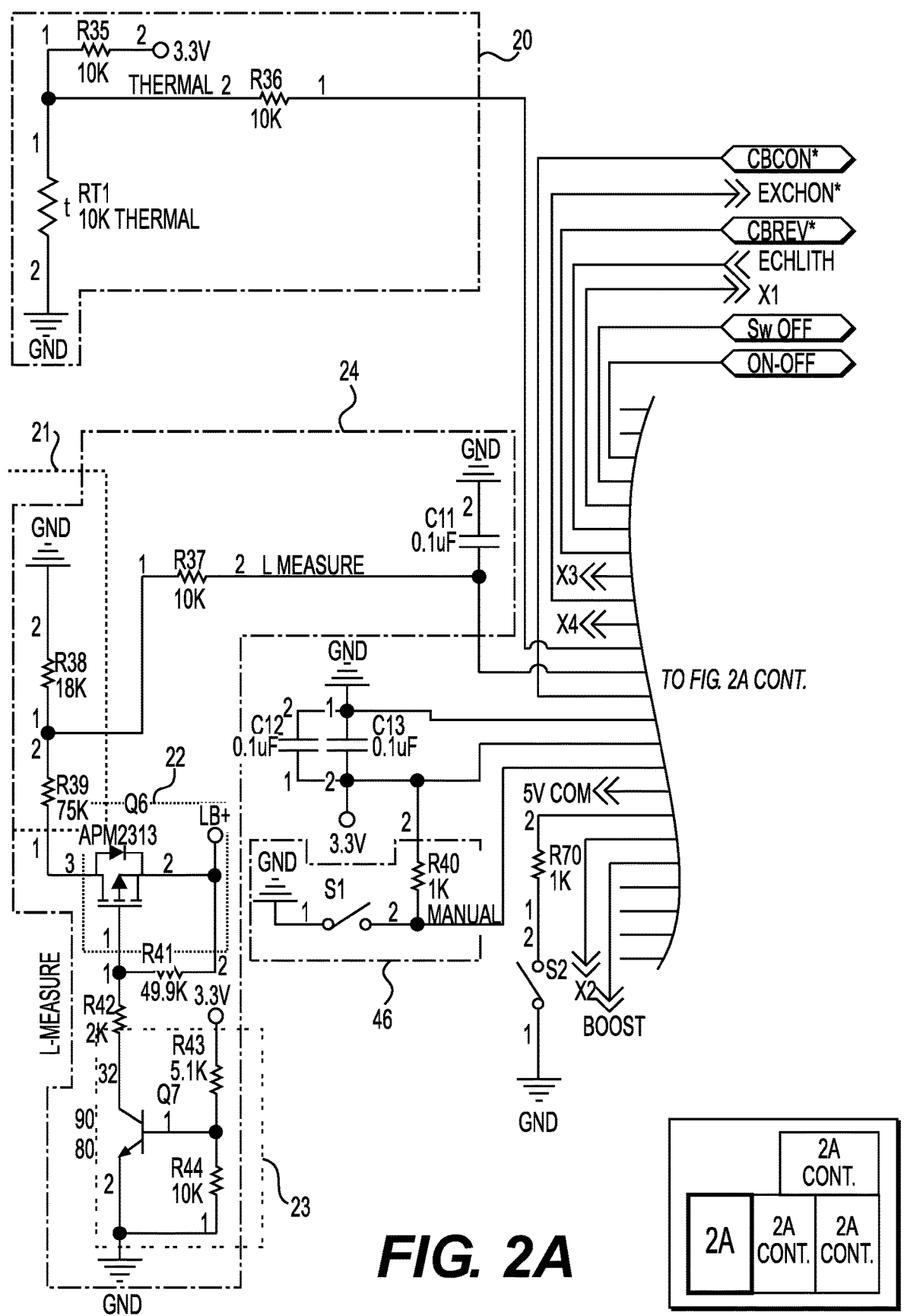
FIGS. 2A-2C are schematic circuit diagrams of an example embodiment of a handheld vehicle battery boost apparatus in accordance with an aspect of the invention.
Figure 2A:
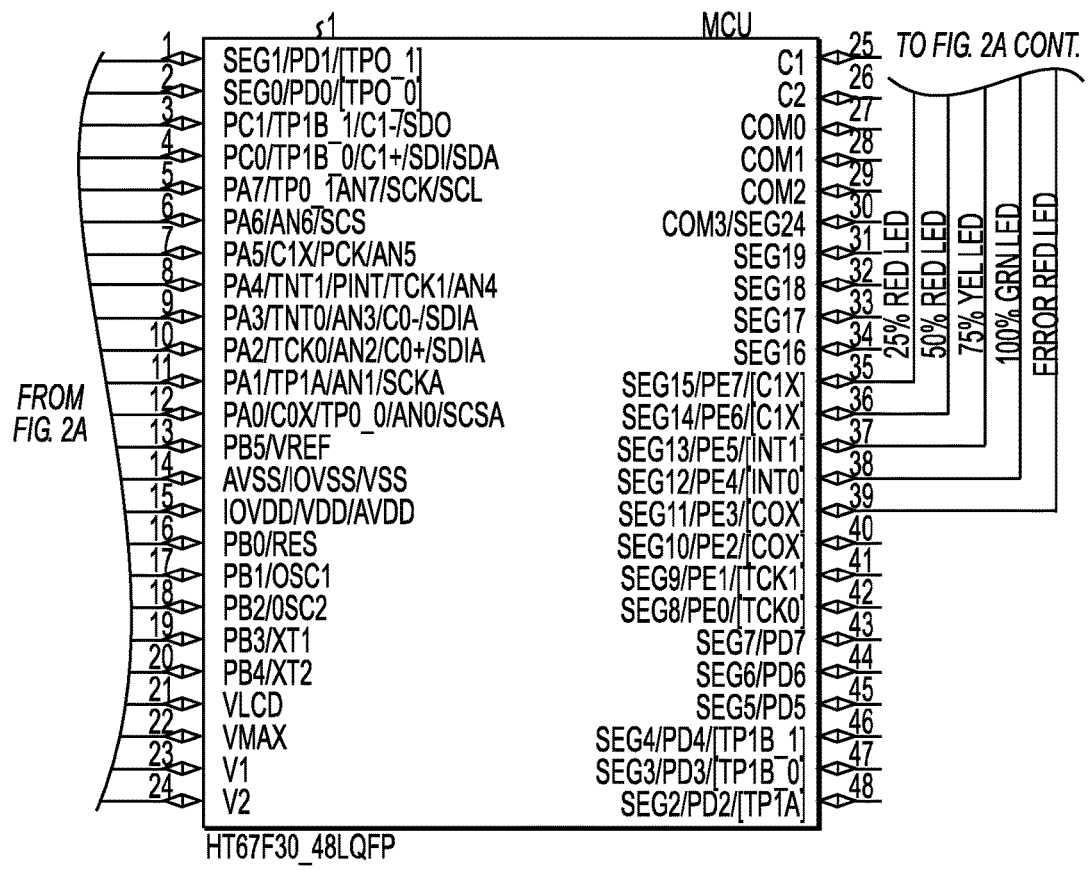
Figure 2A:
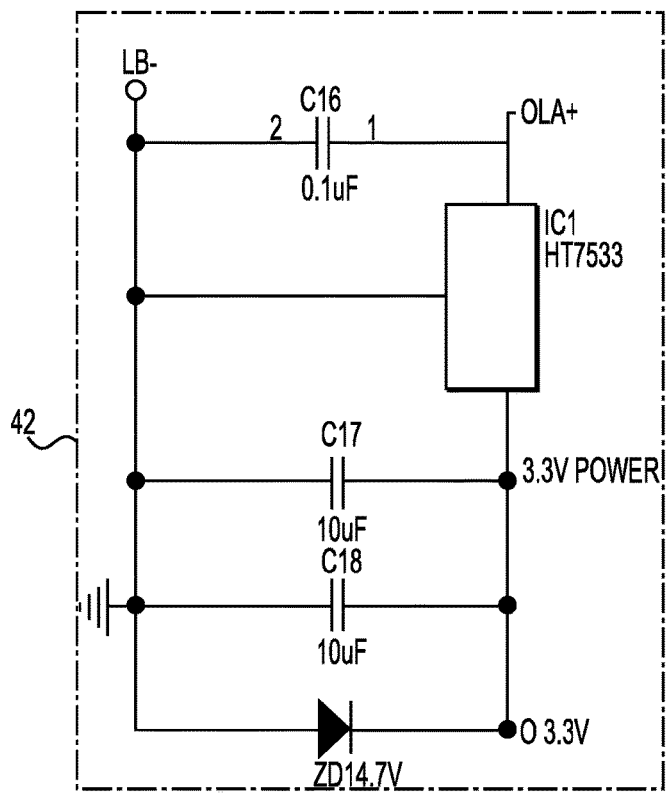
Figure 2A:
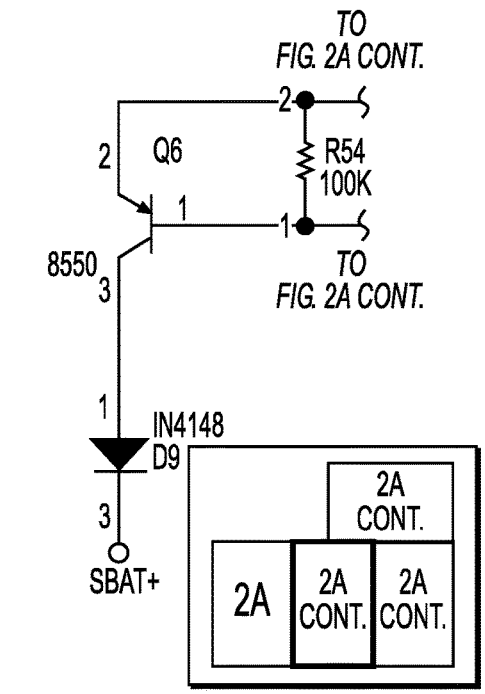
Figure 2A:
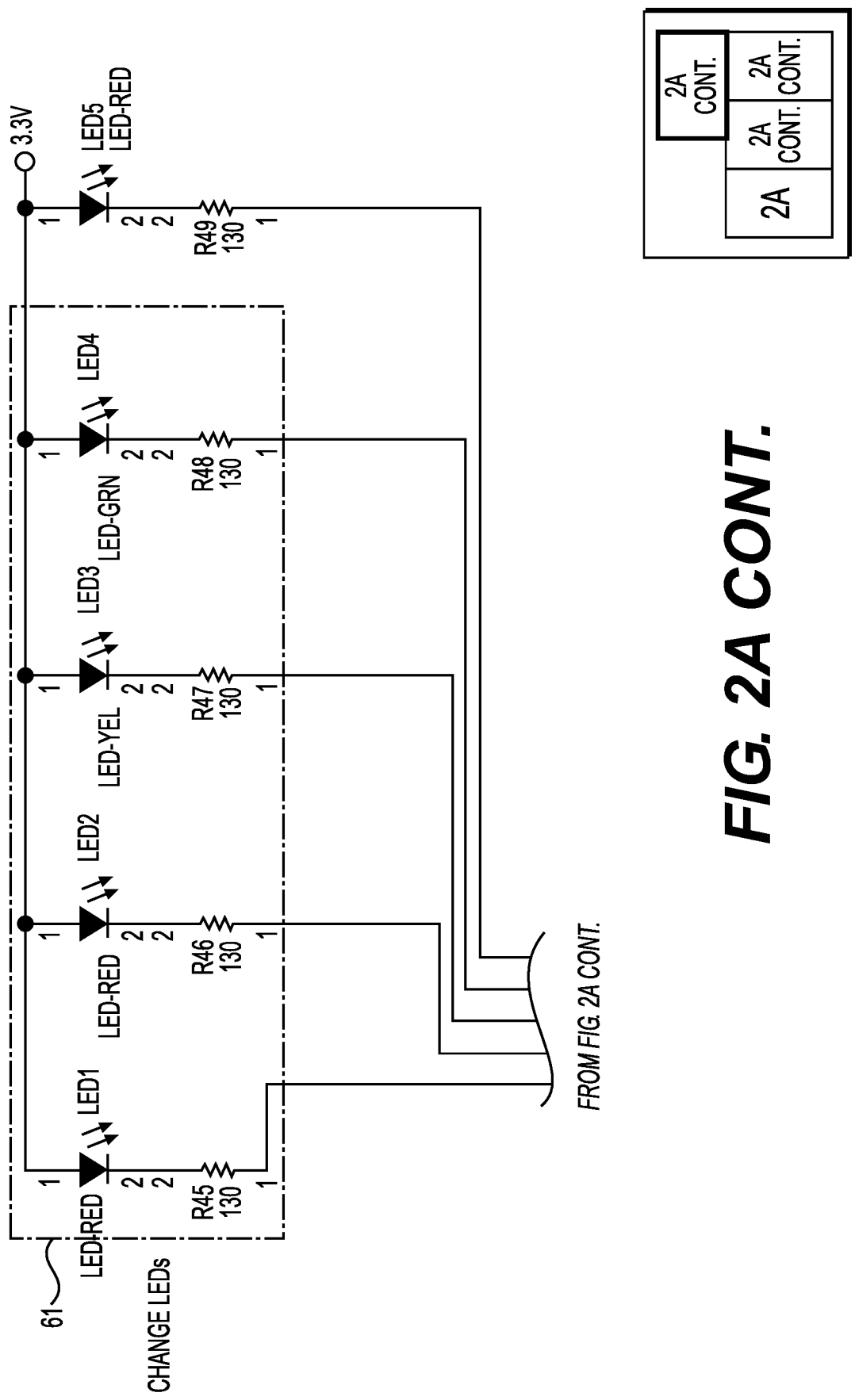

Detailed operation of the handheld booster device will now be described with reference to the schematic diagrams of FIGS. 2A-2C. As shown in FIG. 2A, the microcontroller unit 1 is the center of all inputs and outputs. The reverse battery sensor 10 comprises an optically coupled isolator phototransistor (4N27) connected to the terminals of vehicle battery 72 at input pins 1 and 2 with a diode D8 in the lead conductor of pin 1 (associated with the negative terminal CB−), such that if the battery 72 is connected to the terminals of the booster device with the correct polarity, the optocoupler LED 11 will not conduct current, and is therefore turned off, providing a "1" or high output signal to the MCU 1. The car battery isolation sensor 12 comprises an optically coupled isolator phototransistor (4N27) connected to the terminals of vehicle battery 72 at input pins 1 and 2 with a diode D7 in the lead conductor of pin 1 (associated with the positive terminal CB+), such that if the battery 72 is connected to the terminals of the booster device with the correct polarity, the optocoupler LED 11A will conduct current, and is therefore turned on, providing a "0" or low output signal to the MCU, indicating the presence of a battery across the jumper output terminals of the handheld booster device.

If the car battery 72 is connected to the handheld booster device with reverse polarity, the optocoupler LED 11 of the reverse sensor 10 will conduct current, providing a "0" or low signal to microcontroller unit 1. Further, if no battery is connected to the handheld booster device, the optocoupler LED 11A of the isolation sensor 12 will not conduct current, and is therefore turned off, providing a "1" or high output signal to the MCU, indicating the absence of any battery connected to the handheld booster device. Using these specific inputs, the microcontroller software of MCU 1 can determine when it is safe to turn on the smart switch FET 15, thereby connecting the lithium battery pack to the jumper terminals of the booster device. Consequently, if the car battery 72 either is not connected to the booster device at all, or is connected with reverse polarity, the MCU 1 can keep the smart switch FET 15 from being turned on, thus prevent sparking/short circuiting of the lithium battery pack.

Figure 2B:
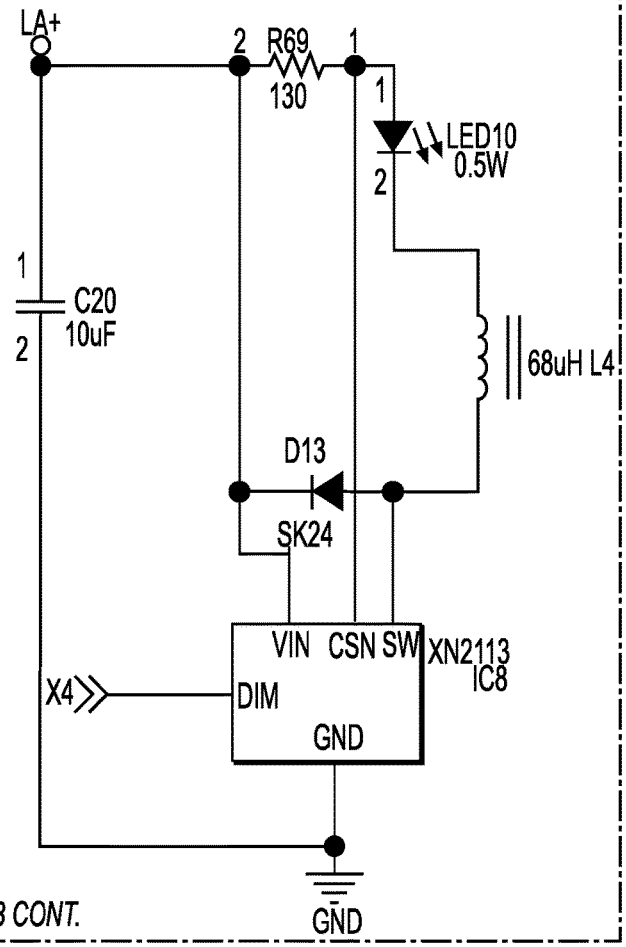
Figure 2B:
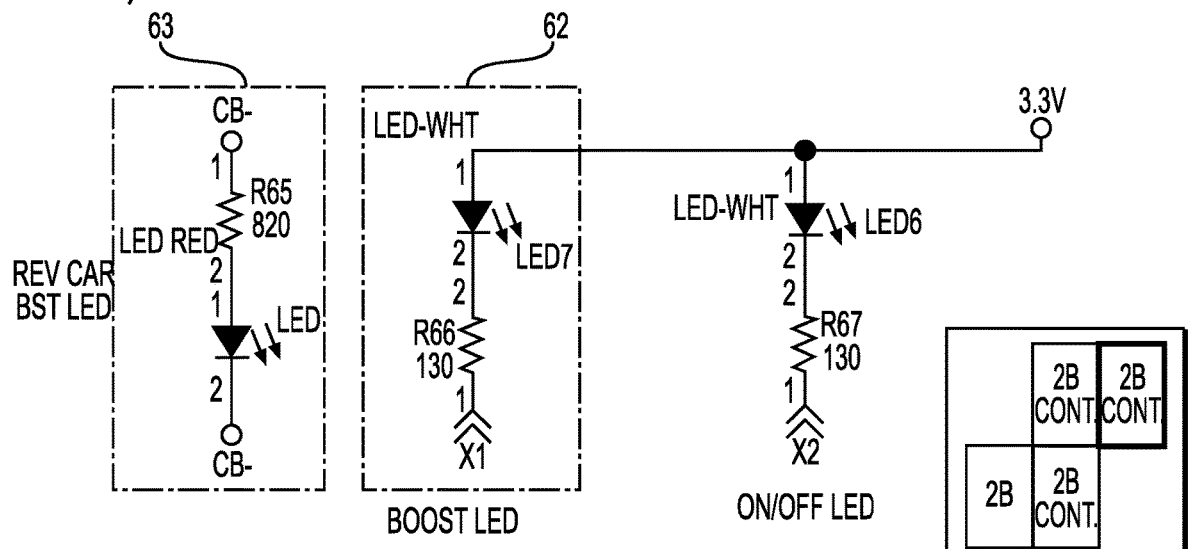
Figure 2C:
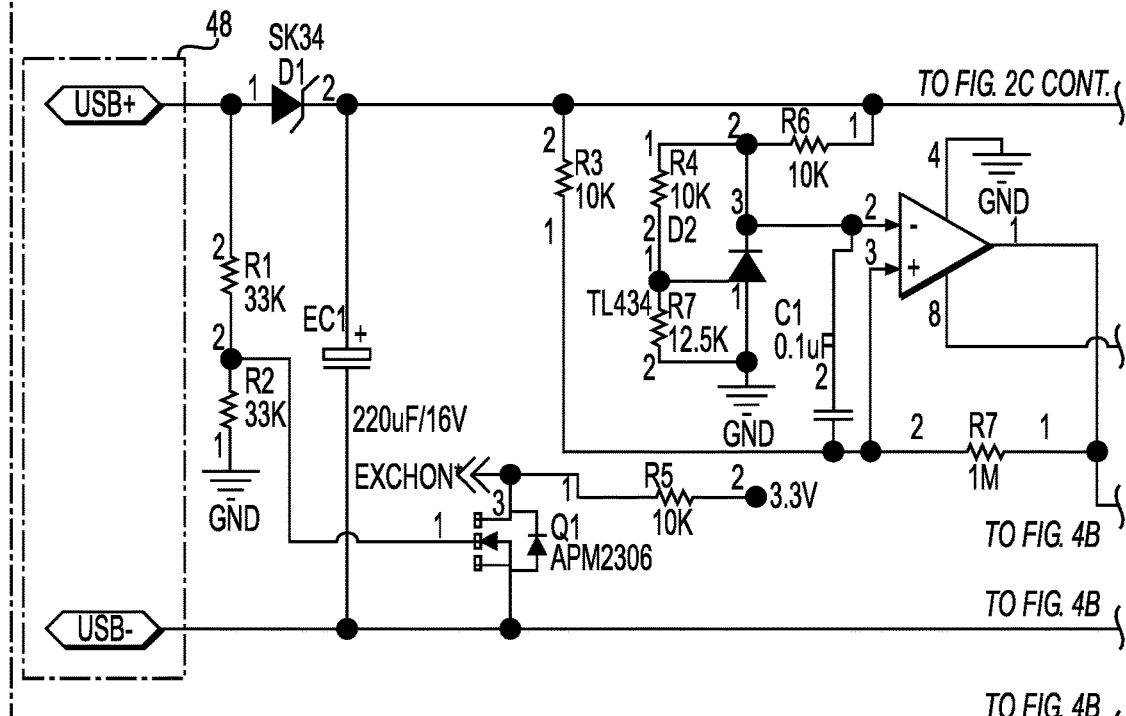
Figure 2C:
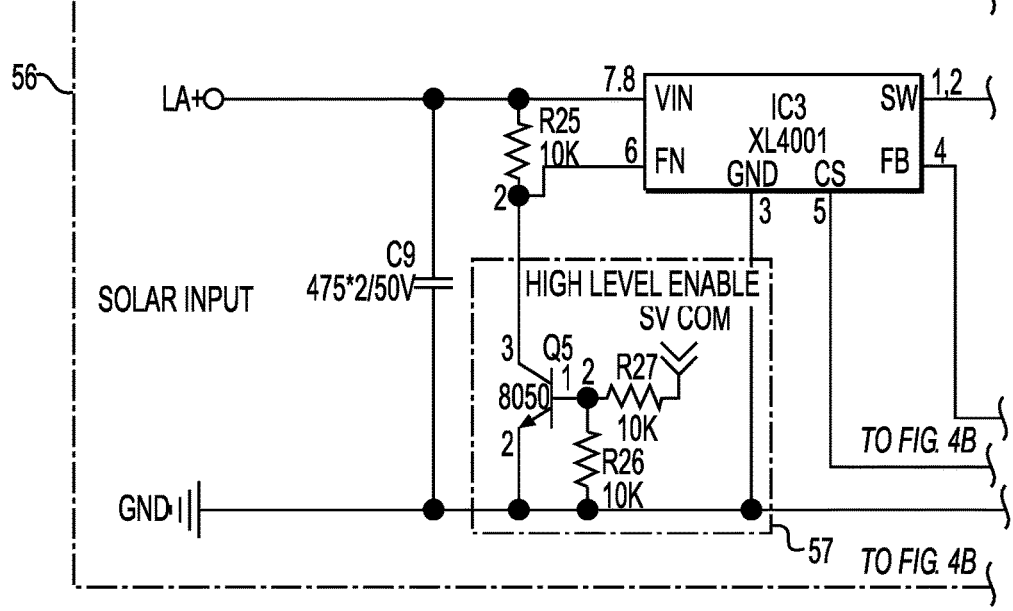

As shown in FIG. 2B, the FET smart switch 15 is driven by an output of the microcontroller 1. The FET smart switch 15 includes three FETs (Q15, Q18, and Q19) in parallel, which spreads the distribution of power from the lithium battery pack over the FETs. When that microcontroller output is driven to a logic low, FETs 16 are all in a high resistance state, therefore not allowing current to flow from the internal lithium battery negative contact 17 to the car battery 72 negative contact. When the micro controller output is driven to a logic high, the FETs 16 (Q15, Q18, and Q19) are in a low resistant state, allowing current to flow freely from the internal lithium battery pack negative contact 17 (LB−) to the car battery 72 negative contact (CB−). In this way, the microcontroller software controls the connection of the internal lithium battery pack 32 to the vehicle battery 72 for jumpstarting the car engine.

Referring back to FIG. 2A, the internal lithium battery pack voltage can be accurately measured using circuit 24 and one of the analog-to-digital inputs of the microcontroller 1. Circuit 24 is designed to sense when the main 3.3V regulator 42 voltage is on, and to turn on transistor 23 when the voltage of regulator 42 is on. When transistor 23 is conducting, it turns on FET 22, thereby providing positive contact (LB+) of the internal lithium battery a conductive path to voltage divider 21 allowing a lower voltage range to be brought to the microcontroller to be read. Using this input, the microcontroller software can determine if the lithium battery voltage is too low during discharge operation or too high during charge operation, and take appropriate action to prevent damage to electronic components.

Still referring to FIG. 2A, the temperature of the internal lithium battery pack 32 can be accurately measured by two negative temperature coefficient (NTC) devices 20. These are devices that reduce their resistance when their temperature rises. The circuit is a voltage divider that brings the result to two analog-to-digital (ND) inputs on the microcontroller 1. The microcontroller software can then determine when the internal lithium battery is too hot to allow jumpstarting, adding safety to the design.

The main voltage regulator circuit 42 is designed to convert internal lithium battery voltage to a regulated 3.3 volts that is utilized by the microcontroller 1 as well as by other components of the booster device for internal operating power. Three lithium battery back charge protection diodes 28 (see FIG. 2B) are in place to allow current to flow only from the internal lithium battery pack 32 to the car battery 72, and not from the car battery to the internal lithium battery. In this way, if the car electrical system is charging from its alternator, it cannot back-charge (and thereby damage) the internal lithium battery, providing another level of safety. The main power on switch 46 (FIG. 2A) is a combination that allows for double pole, double throw operation so that with one push, the product can be turned on if it is in the off state, or turned off if it is in the on state. This circuit also uses a microcontroller output 47 to "keep alive" the power when it is activated by the on switch. When the switch is pressed the microcontroller turns this output to a high logic level to keep power on when the switch is released. In this way, the microcontroller maintains control of when the power is turned off when the on/off switch is activated again or when the lithium battery voltage is getting too low. The microcontroller software also includes a timer that turns the power off after a predefined period of time, (such as, e.g. 8 hours) if not used.

The flashlight LED circuit 45 shown in FIG. 2B controls the operation of flashlight LEDs. Two outputs from the microcontroller 1 are dedicated to two separate LEDs. Thus, the LEDs can be independently software-controlled for strobe and SOS patterns, providing yet another safety feature to the booster device. LED indicators provide the feedback the operator needs to understand what is happening with the product. Four separate LEDs 61 (FIG. 2A) are controlled by corresponding individual outputs of microcontroller 1 to provide indication of the remaining capacity of the internal lithium battery. These LEDs are controlled in a "fuel gauge" type format with 25%, 50% 75% and 100% (red, red, yellow, green) capacity indications. An LED indicator 63 (FIG. 2B) provides a visual warning to the user when the vehicle battery 72 has been connected in reverse polarity. "Boost" and on/off LEDs 62 provide visual indications when the booster device is provide jump-start power, and when the booster device is turned on, respectively.

A USB output 56 circuit (FIG. 2C) is included to provide a USB output for charging portable electronic devices such as smartphones from the internal lithium battery pack 32. Control circuit 57 from the microcontroller 1 allows the USB Out 56 to be turned on and off by software control to prevent the internal lithium battery getting too low in capacity. The USB output is brought to the outside of the device on a standard USB connector 58, which includes the standard voltage divider required for enabling charge to certain smartphones that require it. The USB charge circuit 52 allows the internal lithium battery pack 32 to be charged using a standard USB charger. This charge input uses a standard micro-USB connector 48 allowing standard cables to be used. The 5V potential provided from standard USB chargers is up-converted to the 12.4 VDC voltage required for charging the internal lithium battery pack using a DC-DC converter 49. The DC-DC converter 49 can be turned on and off via circuit 53 by an output from the microcontroller 1.

In this way, the microcontroller software can turn the charge off if the battery voltage is measured to be too high by the ND input 22. Additional safety is provided for helping to eliminate overcharge to the internal lithium battery using a lithium battery charge controller 50 that provides charge balance to the internal lithium battery cells 51. This controller also provides safety redundancy for eliminating over discharge of the internal lithium battery.

Figure 3:
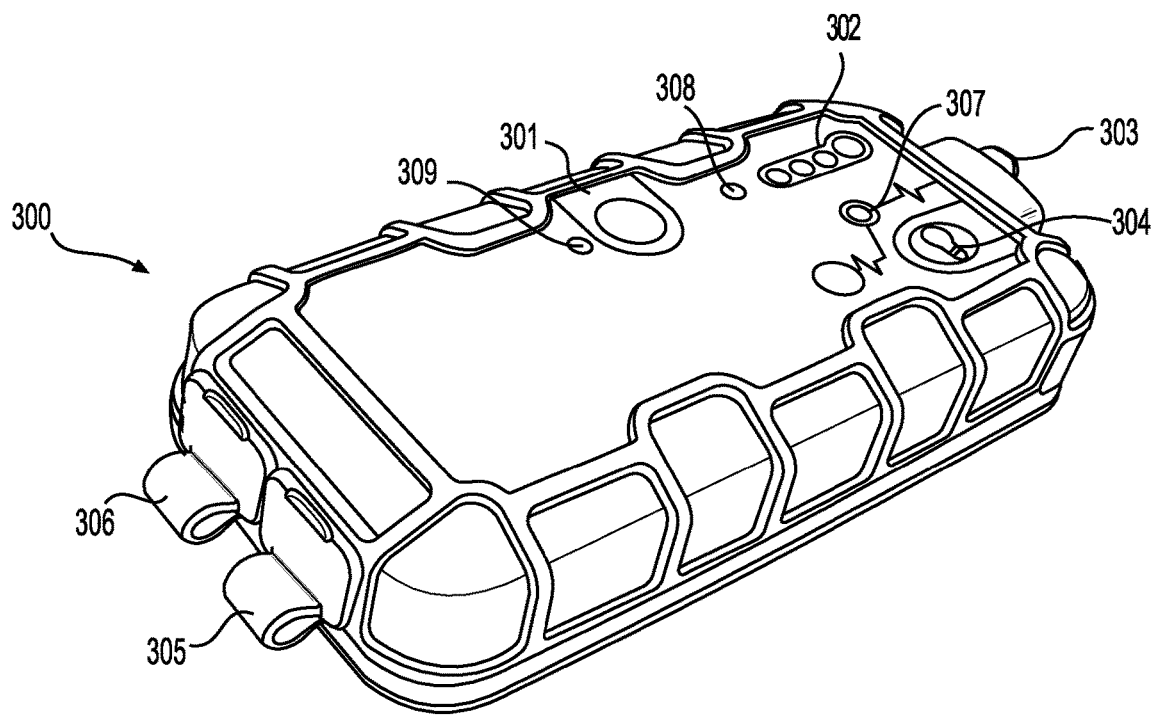
FIG. 3 is a perspective view of a handheld jump starter booster device in accordance with one example embodiment of the invention.

FIG. 3 is a perspective view of a handheld device 300 in accordance with an exemplary embodiment of the invention. 301 is a power on switch, 302 shows the LED "fuel gauge" indicators 61. 303 shows a 12 volt output port connectable to a cable device 400, described further below. 304 shows a flashlight control switch for activating flashlight LEDs 45. 305 is a USB input port for charging the internal lithium battery, and 306 is a USB output port for providing charge from the lithium battery to other portable devices such as smartphones, tablets, music players, etc. 307 is a "boost on" indicator showing that power is being provided to the 12V output port. 308 is a "reverse" indicator showing that the vehicle battery is improperly connected with respect to polarity. 309 is a "power on" indicator showing that the device is powered up for operation.

Figure 4:
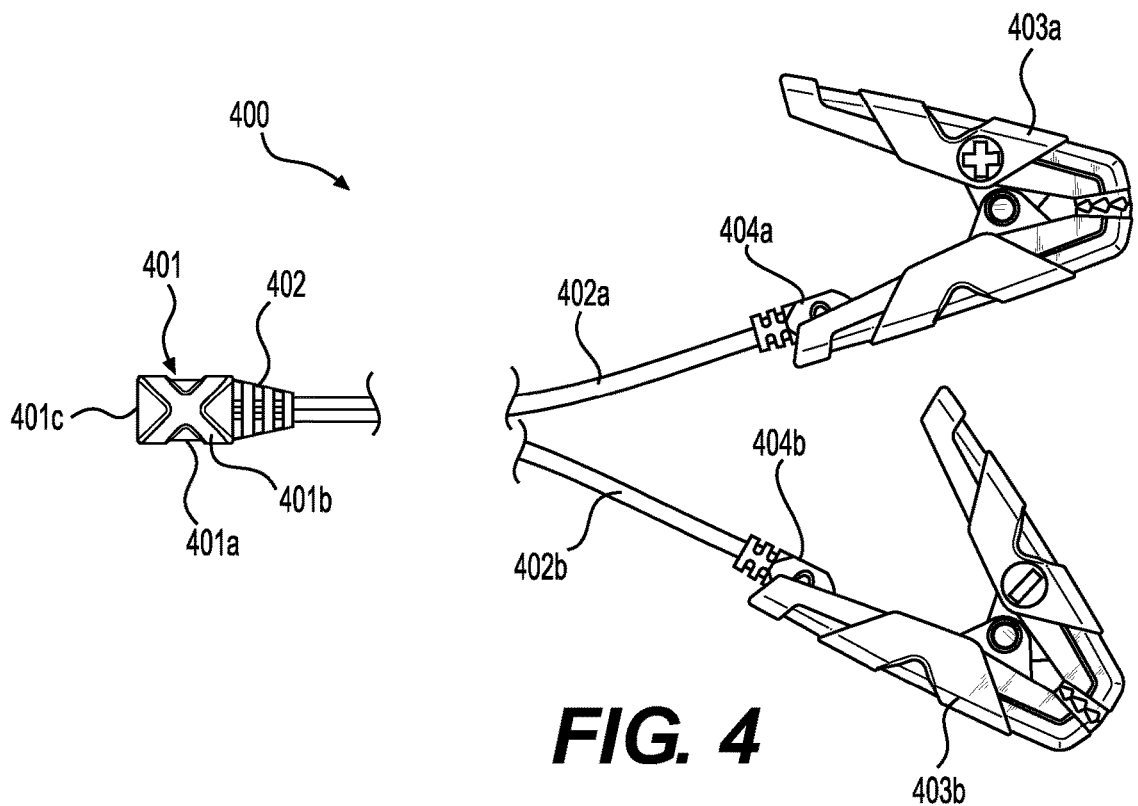
FIG. 4 is a plan view of a jumper cable usable with the handheld jump starter booster device in accordance with another aspect of the invention.

FIG. 4 shows a jumper cable device 400 specifically designed for use with the handheld device 300. Device 400 has a plug 401 configured to plug into 12 volt output port 303 of the handheld device 300. A pair of cables 402a and 402b are integrated with the plug 401, and are respectively connected to the positive and negative polarity battery terminal connectors (e.g. battery terminal clamps 403a and 403b) via ring terminals 404a and 404b. The output port 303 and plug 401 may be dimensioned so that the plug 401 will only fit into the output port 303 in a specific orientation, thus ensuring that clamp 403a will correspond to positive polarity and clamp 403b will correspond to negative polarity, as indicated thereon. Additionally, the ring terminals 404a and 404b may be disconnected from the clamps and connected directly to the terminals of a vehicle battery. This feature may be useful, for example, to permanently attach the cables 302a-302b to the battery of a vehicle. In the event that the battery voltage of the vehicle battery becomes depleted, the handheld booster device 300 can be properly connected to the battery very simply by plugging the plug 401 into the output port 303 of the handheld booster device 300 and connecting the battery clamps 403a and 403b to the battery. The plug 401 provides both positive polarity and negative polarity electrical connections between the output port 303 of the handheld battery charger booster device 300 and the plug 401 of the jumper cable device 400. The plug 401 does not have any exposed prongs, as shown in FIG. 5. Further, the individual cables of the pair of cables at one end are connected together (left side in FIG. 5) and integrated with the plug, and the individual cables at the opposite ends are separated apart (right side in FIG. 5). The plug 401 (FIG. 4) comprises a plug body 401a having a uniform or substantially uniform width W along the length of the plug body 401a, as shown in FIG. 4. The plug body 401a of the plug 401 is provided with a surface protrusion 401b (e.g. X-shaped surface protrusion) extending above the outer surface of the plug body 401a of the plug 401. The plug body 401a is a continuous plug body along the length and width of the plug body, and rectangular-shaped. A downwardly tapering transition 402 is provided between the plug body 401a and the pair of cables 402a and 402b. The downwardly tapering transition 402 is provided with transverse ridges. The plug 401 is a single plug having a single connection end or single prong (left end in FIG. 4) provided with a flat end 401c, as shown, and configured to fit into the output port 303 of the handheld booster device 300.

The invention having been thus described, it will be apparent to those skilled in the art that the same may be varied in many ways without departing from the spirit or scope of the invention. Any and all such variations are intended to be encompassed within the scope of the following claims.

What is claimed is:

1. A jump starting apparatus configured for boosting or charging a depleted or discharged battery having a positive polarity battery terminal and a negative polarity battery terminal, the jump starting apparatus comprising:

a power supply;

a positive polarity battery terminal connector configured for connecting the jump starting apparatus to the positive polarity battery terminal of the depleted or discharged battery;

a negative polarity battery terminal connector configured for connecting the jump starting apparatus to the negative polarity battery terminal of the depleted or discharged battery;

a power switch or circuit configured to turn on power from the power supply to the positive and negative polarity battery terminal connectors;

a control system or circuit connected to and controlling the power switch, the control system or circuit configured to detect whether the positive and negative polarity battery terminal connectors have a correct polarity connection with the positive and negative polarity battery terminals of the depleted or discharged battery prior to turning on the power switch or circuit;

a USB input circuit connected to the power supply, the USB input circuit comprising a DC/DC converter, the USB input circuit configured for converting power from a USB power source to increase power voltage to the power supply; and a USB input connector connected to the USB input circuit, the USB input connector configured for connecting to the USB power source and providing power input from the USB power source through the USB input connector and the USB input circuit to the power supply.

2. The apparatus of claim 1, wherein the power supply comprises a lithium ion battery.

3. The apparatus of claim 2, wherein the lithium ion battery comprises a battery pack of multiple lithium ion batteries.

4. The apparatus of claim 1, wherein the power switch comprises one or more FETs.

5. The apparatus of claim 1, wherein the control system or circuit is configured to detect a presence of the depleted or discharged battery connected between the positive and negative polarity battery terminal connectors and to detect the correct polarity connection of the positive and negative polarity battery terminal connectors of the jump starting device with the positive and negative battery terminals of the depleted or discharged battery.

6. The apparatus of claim 1, further comprising a plurality of power diodes coupled between the positive and negative battery terminal connectors and the power supply to prevent back-charging of the power supply from an electrical system connected to the positive and negative battery terminal connectors.

7. The apparatus of claim 1, further comprising a temperature sensor configured to detect temperature of the power supply and to provide a temperature signal to a microcontroller.

8. The apparatus of claim 1, further comprising a voltage measurement circuit configured to measure output voltage of the power supply and to provide a voltage measurement signal to a microcontroller.

9. The apparatus of claim 1, further comprising a voltage regulator configured to convert output voltage of the power supply to a voltage level appropriate to provide operating power to internal components of the jump starting apparatus.

10. The apparatus of claim 1, further comprising a USB output port configured to provide charging power from the power supply to a USB-chargeable device.

11. The apparatus of claim 1, further comprising a flashlight circuit configured to provide a source of light to a user.

12. The apparatus of claim 11, wherein the source of light is at least one LED.

13. The apparatus of claim 12, wherein the control system or circuit is configured to control the at least one LED to provide a visual alarm indicating an emergency situation.

14. The apparatus of claim 1, further comprising a plurality of visual indicators configured to display remaining capacity status of the power supply.

15. The apparatus of claim 14, wherein the plurality of visual indicators comprises a plurality of LEDs providing output light of different colors.

16. The apparatus of claim 1, further comprising a visual indicator configured to warn a user when the depleted or discharged battery is connected to the jump starting apparatus with reverse polarity.

17. The apparatus of claim 1, further comprising separate visual indicators configured to display a power on status of the jump starting apparatus, and a jump start boost power status of power supplied to an output device.

18. The apparatus of claim 1, further comprising a manual override switch configured to activate a manual override mode to enable a user to connect jump start power to the depleted or discharged vehicle battery when a vehicle battery isolation sensor is unable to detect presence of the vehicle battery.

19. The apparatus of claim 18, wherein the control system or circuit is configured to detect actuation of the manual override switch for at least a predetermined period of time before activation of the manual override mode.

20. The apparatus of claim 1, further comprising a jumper cable device, the jumper cable device comprising a plug configured to plug into an output port of the jump starting apparatus, a pair of battery cables integrated with the plug at one end of the pair of cables, and the positive and negative battery terminal connectors connected to an opposite end of the pair of battery cables.

21. The apparatus of claim 20, wherein the jumper cable device further comprises a pair of ring terminals configured to respectively connect the pair of cables at the opposite end to the respective positive and negative battery terminals of the depleted or discharged battery, or connect to respective positive and negative battery clamps.

22. The apparatus of claim 20, wherein the output port and the plug are dimensioned so that the plug will fit into the output port only in one specific orientation.

23. The apparatus according to claim 1, further comprising a USB output circuit connecting the power supply to a USB output connector for charging portable electronic devices from the power supply.

24. The apparatus according to claim 23, wherein the USB output circuit is connected to a microcontroller, the USB output circuit is configured to allow the USB output circuit to be turned on and off by software control to prevent the power supply from getting too low in capacity.

25. The apparatus according to claim 23, wherein the USB output circuit includes a voltage divider to enable charging of certain electronic devices.

26. The apparatus according to claim 1, including an operation indicator LED to provide visual indication of the power supply capacity status.

27. The apparatus according to claim 1, including an operation indicator LED to provide visual indication of the switch activation status indicating power is being provided to the depleted or discharged battery.

28. The apparatus according to claim 1, wherein the correct polarity connection with the positive and negative polarity battery terminal connectors of the depleted or discharged battery prior to turning on the power switch or circuit can, alternatively, be an incorrect polarity connection.

29. The apparatus according to claim 1, wherein the control system or circuit comprises one or more sensors connected to a microprocessor for determining whether the depleted or discharged battery is present and connected between the positive and negative polarity battery terminal connectors.

30. The apparatus according to claim 1, wherein the control system or circuit comprises one or more sensors connected to a microprocessor for determining whether the depleted or discharged battery is properly or improperly connected to the positive and negative polarity battery terminal connectors.

31. The apparatus according to claim 1, wherein the control system or circuit comprises one or more sensors connected to a microprocessor for determining whether the depleted or discharged battery is present and connected between the positive and negative polarity battery terminal connectors and determining whether the depleted or discharged battery has a correct or incorrect polarity connection with the positive and negative polarity battery terminal connectors.

32. The apparatus according to claim 1, wherein the DC-DC converter can be turned on and off by a microprocessor.

33. The apparatus according to claim 1, wherein the jump starting apparatus is configured to prevent an incorrect polarity connection of the positive and negative battery terminal connectors of the jump starting apparatus with the positive and negative polarity battery terminals of the depleted or discharged battery.

34. The apparatus according to claim 1, wherein the jump starting apparatus is configured to prevent an incorrect polarity connection of the positive and negative battery terminal connectors of the jump starting apparatus with the positive and negative polarity battery terminals of the depleted or discharged battery prior to turning on the power switch or circuit.

35. The apparatus according to claim 1, wherein the jump starting apparatus is configured to prevent an incorrect polarity connection of the positive and negative battery terminal connectors of the jump starting apparatus with the positive and negative polarity battery terminals of the depleted or discharged battery when turning on the power switch or circuit.

36. The apparatus according to claim 1, wherein the jump starting apparatus is configured to prevent an incorrect polarity connection of the positive and negative battery terminal connectors of the jump starting apparatus with the positive and negative polarity battery terminals of the depleted or discharged battery by turning on the power switch only when the depleted or discharged battery is connected with correct polarity to the jump starting apparatus.

37. The apparatus according to claim 1, wherein the jump starting apparatus is configured to prevent an incorrect polarity connection of the positive and negative battery terminal connectors of the jump starting apparatus with the positive and negative polarity battery terminals of the depleted or discharged battery by the jump starting device supplying power to the depleted or discharged battery only when or while connected with correct polarity to the jump starting apparatus.

38. A jump starting apparatus for boosting or charging a depleted or discharged battery having a positive polarity battery terminal and a negative polarity battery terminal, the jump starting apparatus comprising:
a power supply;
a positive polarity battery terminal connector configured for connecting the jump starting apparatus to the positive polarity terminal of the depleted or discharged battery;
a negative polarity battery terminal connector configured for connecting the jump starting apparatus to the negative polarity terminal of the depleted or discharged battery;
a battery presence sensor or circuit connected in circuit with the positive polarity battery terminal connector and the negative polarity battery terminal connector;
a reverse polarity sensor or circuit connected in circuit with the positive polarity battery terminal connector and the negative polarity terminal connector;
a power switch or circuit connected or connectable in circuit with the power supply and the positive and negative polarity battery terminal connectors;
a microcontroller configured to receive input signals provided by the battery presence sensor or circuit and the reverse polarity sensor or circuit, the microcontroller configured to provide an output signal to control the power switch,
a USB input circuit connected to the power supply, the USB input circuit configured for converting power from a USB power source to increase power voltage to the power supply; and
a USB input connector connected to the USB input circuit, the USB input connector configured for connecting to the USB power source and providing power input from the USB power source through the USB input connector and the USB input circuit to the power supply.

39. A jump starting device for boosting or charging a depleted or discharged battery having a positive polarity battery terminal and a negative polarity battery terminal, the jump starter device comprising:
a power supply;
a positive battery terminal connector for connecting the jump starter device to the positive battery terminal of the depleted or discharged battery;
a negative battery terminal connector for connecting the jump starter device to the negative battery terminal of the depleted or discharged battery;
a power switch or circuit connected in circuit with the power supply and the positive and negative battery terminal connectors, the power switch configured to turn power on from the power supply to the depleted or discharged battery when the positive and negative battery terminal connectors are properly connected to the positive and negative battery connectors;
a power switch control system or circuit connected to and controlling the power switch, the power switch control system or circuit configured to detect presence of the depleted or discharged battery when connected between the positive and negative battery terminal connectors and to detect polarity of the depleted or discharged battery when connected between the positive and negative battery terminal connectors;
a USB input circuit connected to the power supply, the USB input circuit configured for converting power from a USB power source to increase power voltage to the power supply; and
a USB input connector configured for connecting to the USB power source and providing power input from the USB power source through the USB input connector and the USB input circuit to the power supply.

40. The device according to claim 39, wherein the power switch control system or circuit does not switch on the power supply to connect the power supply to the depleted or discharged battery when the power switch control system or circuit detects either that (i) the depleted or discharged battery is absent or not connected between the positive and negative battery connectors, and (ii) the depleted or discharged battery is not connected with a correct polarity connection between the positive and negative battery terminal connectors.

41. The device according to claim 39, wherein the power switch control system or circuit is configured to detect presence of the depleted or discharged battery when connected between the positive and negative battery connectors and to detect polarity of the depleted or discharged battery when connected between the positive and negative battery connectors prior to turning power on from the power supply to the depleted or discharged battery.

42. The device according to claim 39, wherein the power switch control system or circuit comprises a microcontroller configured for providing an output controlling the power switch.

43. The device according to claim 42, wherein the microcontroller receives input from one or more sensors configured to detect presence of the depleted or discharged battery when connected between the positive and negative battery connectors and to detect polarity of the depleted or discharged battery when connected between the positive and negative battery connectors.

44. The device according to claim 43, wherein the one or more sensors includes one sensor configured to detect presence of the depleted or discharged battery when connected between the positive and negative battery terminal connectors, and another sensor configured to detect polarity of the depleted or discharged battery when connected between the positive and negative battery terminal connectors.

45. The device according to claim 44, wherein the one or more sensors comprises one or more sensing circuits.

46. The device according to claim 42, wherein the microcontroller is configured to turn on the power switch to provide power from the power supply to the depleted or discharged battery only when the depleted or discharged battery is determined by the microcontroller to be present and properly or improperly connected to the jump starting apparatus.

47. A jump starting device for boosting or charging a depleted or discharged battery having a positive polarity battery terminal and a negative polarity battery terminal, the jump starter device comprising:
a power supply;
a positive battery terminal connector for connecting the jump starter device to the positive battery terminal of the depleted or discharged battery;
a negative battery terminal connector for connecting the jump starter device to the negative battery terminal of the depleted or discharged battery;
a power switch or circuit connected in circuit with the power supply and the positive and negative battery terminal connectors, the power switch configured to turn power on from the power supply to the depleted or discharged battery when connected to the positive and negative battery terminal connectors;
a power switch control system or circuit connected to and controlling the power switch, the power switch control system or circuit configured to detect presence of the depleted or discharged battery when connected between the positive and negative battery terminal connectors and to detect correct or incorrect polarity of the depleted or discharged battery when connected between the positive and negative battery terminal connectors;
a USB input circuit connected to the power supply, the USB input circuit configured for converting power from a USB power source to increase power voltage to the power supply; and
a USB input connector connected to the USB input circuit, the USB input connector configured for connecting to the USB power source and providing power input from the USB power source through the USB input connector and the USB input circuit to the power supply.

48. The apparatus according to claim 47, wherein the USB input circuit comprises a DC-DC converter.

49. The apparatus according to claim 48, wherein the DC-DC converter is configured for up-converting the input voltage received by the USB input connector.

50. The apparatus according to claim 49, wherein the input voltage is about 5V that is up-converted to at least 11.1 VDC for powering the power supply.

51. The apparatus according to claim 48, wherein the USB input charge circuit is configured to turn on and off the DC-DC converter by an output of the control system or circuit comprising a microcontroller.

52. A jump starting apparatus configured for boosting or charging a depleted or discharged battery having a positive polarity battery terminal and a negative polarity battery terminal, the jump starting apparatus comprising:
a power supply;
a positive polarity battery terminal connector configured for connecting the jump starting apparatus to the positive polarity battery terminal of the depleted or discharged battery;
a negative polarity battery terminal connector configured for connecting the jump starting apparatus to the negative polarity battery terminal of the depleted or discharged battery;
a power switch or circuit configured to turn on power from the power supply to the positive and negative polarity battery terminal connectors;
a control system or circuit connected to and controlling the power switch, the control system or circuit comprising a microcontroller, the control system or circuit configured to detect whether the positive and negative polarity battery terminal connectors have a correct or incorrect polarity connection with the positive and negative polarity battery terminals of the depleted or discharged battery prior to turning on the power switch;
a USB input connector configured for removably connecting to a USB power source and providing power input from the USB power source to the USB input connector; and
a USB input circuit connecting the USB input connector to the power supply, the USB input circuit comprising a DC/DC converter, the USB input circuit configured for converting power from the USB power source to increase power voltage to the power supply,
wherein the DC-DC converter can be turned on and off by an output from the microcontroller.

53. The apparatus according to claim 52, wherein the DC-DC converter can be turned on and off via the control system or circuit by the output from the microcontroller.

54. A jump starting apparatus configured for boosting or charging a depleted or discharged battery having a positive polarity battery terminal and a negative polarity battery terminal, the jump starting apparatus comprising:
a power supply;
a positive polarity battery terminal connector configured for connecting the jump starting apparatus to the positive polarity battery terminal of the depleted or discharged battery;
a negative polarity battery terminal connector configured for connecting the jump starting apparatus to the negative polarity battery terminal of the depleted or discharged battery;
a power switch or circuit configured to turn on power from the power supply to the positive and negative polarity battery terminal connectors;
a control system or circuit connected to and controlling the power switch, the control system or circuit configured to detect whether the positive and negative polarity battery terminal connectors have a correct polarity connection with the positive and negative polarity battery terminals of the depleted or discharged battery and prevent an incorrect polarity connection with the positive and negative polarity battery terminals of the depleted or discharged battery prior to turning on the power switch or circuit;

a USB input connector; and a USB input circuit connecting the USB input connector to the power supply, the USB input circuit comprising a DC/DC converter for up-converting the voltage from the USB input connector to the power supply.

\* \* \* \* \*